(12) United States Patent
Marutani et al.

(10) Patent No.: US 10,001,205 B2
(45) Date of Patent: Jun. 19, 2018

(54) CONTROL APPARATUS OF FOUR-WHEEL DRIVE VEHICLE

(71) Applicant: Mazda Motor Corporation, Aki-gun, Hiroshima (JP)

(72) Inventors: Tetsushi Marutani, Higashihiroshima (JP); Hiraku Nishikawa, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 93 days.

(21) Appl. No.: 15/005,873

(22) Filed: Jan. 25, 2016

(65) Prior Publication Data

US 2016/0215869 A1    Jul. 28, 2016

(30) Foreign Application Priority Data

Jan. 27, 2015 (JP) .................. 2015-013607
Jan. 27, 2015 (JP) .................. 2015-013610
(Continued)

(51) Int. Cl.
*B60W 30/20* (2006.01)
*F16H 57/00* (2012.01)
(Continued)

(52) U.S. Cl.
CPC ......... *F16H 57/0006* (2013.01); *B60K 17/34* (2013.01); *F16H 59/76* (2013.01);
(Continued)

(58) Field of Classification Search
CPC .............. Y10T 477/755; Y10T 477/78; Y10T 477/6422; B60W 30/20; B60W 2030/206;
(Continued)

(56) References Cited

U.S. PATENT DOCUMENTS

| 7,877,184 B2 * | 1/2011 | Watanabe | B60K 6/365 180/247 |
| 2008/0154468 A1 * | 6/2008 | Berger | B60K 6/365 701/54 |

(Continued)

FOREIGN PATENT DOCUMENTS

JP          2001277881 A    10/2001

*Primary Examiner* — Roger L Pang
(74) *Attorney, Agent, or Firm* — Alleman Hall Creasman & Tuttle LLP

(57) ABSTRACT

A four-wheel drive vehicle is provided, including an engine with an operating mode that is switchable between all-cylinder and reduced-cylinder operating modes, a torque transmission assembly for transmitting an output torque of an engine to main drive wheels and auxiliary drive wheels, a torque ratio adjusting device included in the torque transmission assembly and configured to adjust a ratio of the output torque distributed to the auxiliary drive wheels, and controller that executes a noise suppression module for increasing the torque ratio provided to the auxiliary drive wheels by the torque ratio adjusting device so as to suppress noise generation at the torque transmission assembly, in the all-cylinder and reduced-cylinder operating modes. The noise suppression device changes the torque ratio provided to the auxiliary drive wheels according to engine operating ranges where the torque transmission assembly is in a noise generating state in the all-cylinder and reduced-cylinder operating modes, respectively.

18 Claims, 24 Drawing Sheets

(30) Foreign Application Priority Data

Jan. 27, 2015 (JP) ................................. 2015-013623
Nov. 4, 2015 (JP) ................................. 2015-216354

(51) Int. Cl.
*B60K 17/34* (2006.01)
*F16H 59/76* (2006.01)
*B60W 30/02* (2012.01)
*B60K 23/08* (2006.01)

(52) U.S. Cl.
CPC ...... *B60K 2023/0858* (2013.01); *B60W 30/02* (2013.01); *B60W 2030/206* (2013.01); *Y10T 477/6422* (2015.01); *Y10T 477/755* (2015.01); *Y10T 477/78* (2015.01)

(58) Field of Classification Search
CPC ......... F16H 57/0006; F16H 2057/0012; F16H 59/76; B60K 2023/0858
See application file for complete search history.

(56) References Cited

U.S. PATENT DOCUMENTS

2013/0035832 A1* 2/2013 Nozu .................... B60K 17/35
701/69
2017/0113681 A1* 4/2017 Kanou .................. B60W 30/02

\* cited by examiner

CONTROL APPARATUS OF FOUR-WHEEL DRIVE VEHICLE

CROSS REFERENCE TO RELATED APPLICATIONS

This application claims priority to Japanese patent applications JP2015-013623 filed on Jan. 27, 2015, JP2015-013607 filed on Jan. 27, 2015, JP2015-013610 filed on Jan. 27, 2015, and JP2015-216354 filed on Nov. 4, 2015, which in turn claims domestic priority from JP2015-013623. The entire contents of all of these applications are hereby incorporated by reference for all purposes.

BACKGROUND

The present invention relates to a control apparatus of a four-wheel drive vehicle which has an engine of which an operating mode is switchable between an all-cylinder operating mode and a reduced-cylinder operating mode, and to the four-wheel drive vehicle.

Conventionally, four-wheel drive vehicles are known to comprise a power unit provided with a transfer case for driving rear wheels. The power unit includes an engine, a transmission, and a front-wheel differential device, is mounted on a front part of a vehicle body, and drives left and right front-wheels (main drive wheels) of the four-wheel drive vehicle. Further, a propeller shaft extending in front-and-rear directions of the vehicle body is coupled to the transfer case, and a rear-wheel differential device is coupled to a rear end part of the propeller shaft, so that left and right rear-wheels (auxiliary drive wheels) of the four-wheel drive vehicle can also be driven.

In the four-wheel drive vehicle, a coupling capable of varying a transmission torque may be disposed on the propeller shaft. When the coupling is fully fastened (i.e., engaged), an output torque of the engine is evenly applied to the front and rear wheels (four-wheel drive state), when the coupling is fully released (i.e., disengaged), the output torque of the engine is only applied to the front wheels (two-wheel drive state), and when the coupling is between the fully engaged state and the fully disengaged state, the distribution of the transmission torque applied to the rear wheels is adjusted according to the engaged state.

Further, as the transfer case, a pair of bevel gears meshed with each other, specifically, a bevel gear provided on an extended line of a central axis of the front-wheel differential device and a bevel gear provided on an extended line of a central axis of the propeller shaft, are used to transmit power to the propeller shaft extending in the front-and-rear directions of the vehicle body from the front-wheel differential device, of which a central axis extends in a width direction of the vehicle body.

With regards to four-wheel drive vehicles, in the four-wheel drive state where the front and rear wheels are driven, the distribution of the output torque of the engine to the rear wheels is increased compared to the two-wheel drive state where only the front wheels are driven, leading to drive loss and degradation in fuel economy; therefore, four-wheel drive vehicles normally travel in the two-wheel drive state, travelling in the four-wheel drive state only when necessary.

However, since the output torque of the engine varies due to intermittently performed combustion inside a combustion chamber of the engine, the variation in output torque is subsequently applied to the transfer case via the transmission and the front-wheel differential device, so that in the two-wheel drive state, a drivetrain from the bevel gear of the transfer case to the rear wheels, i.e., including the propeller shaft and the rear-wheel differential device, rotates in a non-power transmission state where power is not transmitted from the drivetrain.

Therefore, depending on the oscillation frequency of the torque variation of the engine, the drivetrain having a predetermined characteristic frequency of vibration with respect to torsional vibration co-resonates with the frequency of the torque variation of the engine and causes a large vibration in the drivetrain. Due to this vibration, noise is generated by teeth rattling between the pair of bevel gears, for example, which may cause noise inside a cabin of the vehicle.

FIG. 18 is a chart illustrating relationships between an oscillation frequency of torque variation of an engine and a torque transmission characteristic with respect to torsional vibration of a drivetrain, in a four-wheel drive vehicle and a two-wheel drive vehicle having conventional basic structures, respectively. A waveform W1 of the transmission characteristic (the waveform indicated by the solid line) with respect to the torsional vibration of the four-wheel drive vehicle and a waveform W2 of the transmission characteristic (the waveform indicated by the dashed line) with respect to the torsional vibration of the two-wheel drive vehicle, which are illustrated in FIG. 18, both have resonance peaks P1 and P2 at frequencies below a practical range of the engine (below a frequency $f_L$). Within the practical range of the engine (the frequency $f_L$ and above), the waveform W1 of the four-wheel drive vehicle has a resonance peak P3 which is not seen in the waveform W2 of the two-wheel drive vehicle. Consequently, noise may be generated in the four-wheel drive vehicle due to vibration at the peak P3.

With regards to the resonance peak P3 of the drivetrain peculiar to the four-wheel drive vehicle, noise generation due to the resonance of the drivetrain and the resulting teeth rattling between the pair of bevel gears, for example, may be suppressed by increasing the torque distribution from the two-wheel drive state, where only the front wheels are driven, to the rear wheels via the coupling, so as to apply a load on the drivetrain to increase the torque to be applied to the rear wheels within an engine operating range in which the drivetrain resonates with the torque variation of the engine.

JP2001-277881A discloses an art for increasing a distribution of an output torque of an engine to rear wheels within a knocking range of the engine operation, so as to suppress vibration caused by knocking from being transmitted from a transfer case to a rear-wheel differential device and noise generation. However, it will be appreciated that JP2001-277881A does not disclose suppressing teeth rattling between gears of a drivetrain, which includes a propeller shaft and a rear-wheel differential device, from a bevel gear of a transfer case to rear wheels, due to resonance caused by torque variation of an engine in a four wheel drive vehicle.

Meanwhile, among four-wheel drive vehicles of a type which switches its driving state between a two-wheel drive state and a four-wheel drive state, four-wheel drive vehicles are known which include an engine having a plurality of cylinders and of which an operating mode is switchable between an all-cylinder operating mode, where all of the plurality of cylinders are operated and a reduced-cylinder operating mode, where one or some of the plurality of cylinders are operated, so as to improve a fuel economy of the engine.

In such a four-wheel drive vehicle, since a frequency of torque variation of the engine is different between the all-cylinder and reduced-cylinder operating modes of the engine even at the same engine speed, engine speeds at which a drivetrain from a bevel gear of a transfer case to rear wheels, which includes a propeller shaft and a rear-wheel differential device, resonate with the torque variation of the engine are also different therebetween.

For example, when the engine includes four cylinders, in a reduced-cylinder operating mode where operation of two of the cylinders is suspended, a frequency of torque variation of this engine is half of that in an all-cylinder operating mode at the same engine speed, and an engine speed at which the drivetrain resonates with the torque variation of the engine becomes twice the engine speed at which the drivetrain resonates in the all-cylinder operating mode.

FIG. 19 is a chart illustrating relationships between an engine speed and a varying torque of a drivetrain, in an all-cylinder operating mode and a reduced-cylinder operating mode of a four-wheel drive vehicle. As illustrated in FIG. 19, in the four-wheel drive vehicle including a four-cylinder engine, a waveform W11 of the varying torque of the drivetrain in the all-cylinder operating mode where the four cylinders are operated (the waveform indicated by the solid line) has resonance peaks P11 and P12 at engine speeds below a practical range of the engine (below an engine speed $N_L$), and has a resonance peak P13 at an engine speed within the practical range of the engine (the engine speed $N_L$ and higher). Further, a waveform W12 of the varying torque of the drivetrain in the reduced-cylinder operating mode where two of the cylinders are operated (the waveform indicated by the dashed line) has resonance peaks P21, P22, and P23 at twice the engine speeds of the peaks P11, P12, and P13, respectively.

Therefore, even if noise generation is suppressed in the all-cylinder operating mode by increasing the torque distributed via the coupling to the rear wheels within the operating range where the drivetrain resonates with the torque variation of the engine in the all-cylinder operating mode, noise may still occur within the operating range where the drivetrain resonates with the torque variation of the engine in the reduced-cylinder operating mode.

Additionally, the increase of the torque distribution to the rear wheels via the coupling to suppress noise generation in the drivetrain due to the torque variation of the engine may lead to an increased drive loss due to mechanical losses from the drivetrain, and may result in degradation of fuel economy.

SUMMARY

The present invention is made in view of the above issues and aims to suppress, in a four-wheel drive vehicle which has an engine of which operating mode is switchable between an all-cylinder operating mode and a reduced-cylinder operating mode, a generation of noise in the all-cylinder operating mode as well as in the reduced-cylinder operating mode, while suppressing the degradation of fuel economy.

For addressing the above issues, the present invention is characterized by being configured as follows.

According to one aspect of the present invention, a four-wheel drive vehicle includes an engine configured with an operating mode that is switchable between an all-cylinder operating mode and a reduced-cylinder operating mode, a torque transmission assembly configured to transmit an output torque of the engine to main drive wheels and auxiliary drive wheels, a torque ratio adjusting device included within the torque transmission assembly, configured to adjust a ratio of the output torque that is distributed to the auxiliary drive wheels, and a controller that executes a noise suppression module to cause the torque ratio adjusting device to increase the torque ratio applied to the auxiliary drive wheels, so as to suppress a generation of noise at the torque transmission assembly in the all-cylinder and reduced-cylinder operating modes. The controller that executes the noise suppression module causes the torque ratio adjusting device to change the torque ratio applied to the auxiliary drive wheels according to engine operating ranges in which the torque transmission assembly is in a noise generating state in the all-cylinder and reduced-cylinder operating modes, respectively.

With the above configuration, a noise suppression module is provided for increasing, in the all-cylinder and reduced-cylinder operating modes, the torque ratio applied to the auxiliary drive wheels that has been adjusted by the torque ratio adjusting device to suppress the generation of noise at the torque transmission assembly. The noise suppression module changes the torque ratio applied to the auxiliary drive wheels according to the engine operating ranges in which the torque transmission assembly is in the noise generating state in the all-cylinder and reduced-cylinder operating modes, respectively.

Therefore, in the all-cylinder operating mode, to suppress noise generation, the torque ratio applied to the auxiliary drive wheels is increased within the engine operating range where the torque transmission assembly is in the noise generating state in the all-cylinder operating mode, and in the reduced-cylinder operating mode, to suppress noise generation, the torque ratio applied to the auxiliary drive wheels is increased within the engine operating range where the torque transmission assembly is in the noise generating state in the reduced-cylinder operating mode. Thus, noise generation can be suppressed in the all-cylinder operating mode, as well as in the reduced-cylinder operating mode, while suppressing the degradation of fuel economy.

The four-wheel drive vehicle may be provided with a damper configured to suppress the generation of noise by the torque transmission assembly in the reduced-cylinder operating mode. The controller that executes the noise suppression module may cause the torque ratio adjusting device to increase the torque ratio applied to the auxiliary drive wheels to suppress the noise generation to a value that is smaller in the reduced-cylinder operating mode than in the all-cylinder operating mode.

With the above configuration, the four-wheel drive vehicle is provided with a damper for suppressing noise generation at the torque transmission assembly in the reduced-cylinder operating mode, and the controller that executes the noise suppression module adjusts the torque ratio applied to the auxiliary drive wheels to be smaller in the reduced-cylinder operating mode than in the all-cylinder operating mode. Thus, the torque ratio applied to the auxiliary drive wheels, which is increased to suppress noise generation in the reduced-cylinder operating mode, can be adjusted to be smaller via the damper, and the degradation of fuel economy can be suppressed even more.

The damper may be a centrifugal pendulum absorber.

With the above configuration, since the damper is a centrifugal pendulum absorber, the effects described above can specifically be achieved by the centrifugal pendulum absorber that suppresses noise generation at the torque transmission assembly in the reduced-cylinder operating mode.

In a change from a first operating mode to a second operating mode, the change being selected from a group consisting of a change from the all-cylinder operating mode to the reduced-cylinder operating mode and a change from the reduced-cylinder operating mode to the all-cylinder operating mode, within an engine operating range where the torque ratio applied to the auxiliary drive wheels is increased by the change to be larger in the second operating mode after the change than in the first operating mode before the change, the controller that executes the noise suppression module may cause the torque ratio adjusting device to temporarily increase the torque ratio applied to the auxiliary drive wheels to be larger than the torque ratio applied in the second operating mode after the change.

With the above configuration, during a change in the operating mode, within the engine operating range where the torque ratio applied to the auxiliary drive wheels would be increased during the change, the controller that executes the noise suppression module temporarily increases the torque ratio applied to the auxiliary drive wheels to be larger than the torque ratio that would be finally applied in the operating mode after the change is completed. Thus, the torque ratio applied to the auxiliary drive wheels can be swiftly increased to the torque ratio to be finally applied in the operating mode after the change is completed, and noise generation due to a response lag in controlling the increase in the torque ratio applied to the auxiliary drive wheels can be suppressed.

In the change from the first operating mode to the second operating mode, within an engine operating range where the torque ratio applied to the auxiliary drive wheels is reduced to be smaller in the second operating mode after the change than in the first operating mode before the change, the controller that executes the noise suppression module may cause the torque ratio adjusting device to temporarily reduce the torque ratio applied to the auxiliary drive wheels to be smaller than the torque ratio applied in the second operating mode after the change.

With the above configuration, during the change of the operating mode, within the engine operating range where the torque ratio applied to the auxiliary drive wheels would be reduced during the change, the controller that executes the noise suppression module temporarily reduces the torque ratio applied to the auxiliary drive wheels to be smaller than the torque ratio that would be applied in the operating mode after the change is completed. Thus, the torque ratio applied to the auxiliary drive wheels can be swiftly reduced to the torque ratio to be finally applied in the operating mode after the change is completed, and the degradation of fuel economy can be suppressed even more.

In the change from the all-cylinder operating mode to the reduced-cylinder operating mode, the controller that executes the noise suppression module may cause the torque ratio adjusting device to temporarily change the torque ratio applied to the auxiliary drive wheels based on an operating mode changing torque map in which a relationship between a speed of the engine and the torque ratio applied to the auxiliary drive wheels in the change from the all-cylinder operating mode to the reduced-cylinder operating mode is preset. In the change from the reduced-cylinder operating mode to the all-cylinder operating mode, the controller that executes the noise suppression module may cause the torque ratio adjusting device to temporarily change the torque ratio applied to the auxiliary drive wheels based on an operating mode changing torque map in which a relationship between an engine speed and the torque ratio applied to the auxiliary drive wheels in the change from the reduced-cylinder operating mode to the all-cylinder operating mode is preset.

With the above configuration, in changing the operating mode, the controller that executes the noise suppression module temporarily changes the torque ratio applied to the auxiliary drive wheels based on the torque map for operating mode changes, in which the relationship between the engine speed and the torque ratio applied to the auxiliary drive wheels is preset, and thus, the effects described above can be effectively obtained.

A combustion mode of the engine may be configured with a combustion mode that is switchable between a spark-ignition mode and a compression-ignition mode. The controller that executes the noise suppression module may cause the torque ratio adjusting device to change the torque ratio applied to the auxiliary drive wheels in the spark-ignition mode and the compression-ignition mode.

With the above configuration, the controller that executes the noise suppression module changes the torque ratio applied to the auxiliary drive wheels in accordance with the spark-ignition and compression-ignition modes, to increase the torque ratio applied to the auxiliary drive wheels in the compression-ignition mode, where torque variation becomes larger than in the spark-ignition mode, to be higher than that in the spark-ignition mode. Thus, noise generation can be suppressed in each combustion mode while suppressing the degradation of fuel economy.

When a switch from the spark-ignition mode to the compression-ignition mode occurs within an engine operating range where the torque ratio applied to the auxiliary drive wheels is to be increased to be larger in the compression-ignition mode than in the spark-ignition mode, the controller that executes the noise suppression module may cause the torque ratio adjusting device to temporarily increase the torque ratio applied to the auxiliary drive wheels to be larger than a torque ratio applied after the switch in the compression-ignition mode.

With the above configuration, during the switch from the spark-ignition mode to the compression-ignition mode, within an engine operating range where the torque ratio applied to the auxiliary drive wheels is increased, the controller that executes the noise suppression module temporarily increases the torque ratio applied to the auxiliary drive wheels to be larger than the torque ratio applied in the compression-ignition mode. Thus, the torque ratio applied to the auxiliary drive wheels can be swiftly increased to the torque ratio in the compression-ignition mode, and thus, noise generation due to the control response lag in the increase of the torque ratio applied to the auxiliary drive wheels can be suppressed.

To suppress noise generation, in the all-cylinder operating mode, the controller that executes the noise suppression module may cause the torque ratio adjusting device to increase the torque ratio applied to the auxiliary drive wheels within a first engine operating range where the torque transmission assembly is in the noise generating state in the all-cylinder operating mode. In the reduced-cylinder operating mode, the controller that executes the noise suppression module may cause the torque ratio adjusting device to increase the torque ratio applied to the auxiliary drive wheels within a second engine operating range that is on a higher engine speed side of the first engine operating range and includes an engine operating range where the torque transmission assembly is in the noise generating state in the reduced-cylinder operating mode.

With the above configuration, since the torque to the auxiliary drive wheels is increased so that noise is suppressed when the torque transmission assembly is in the noise generating operating range in the all-cylinder operating mode as well as the reduced-cylinder operating mode, it is possible to suppress noise during any operating mode in a four-wheel vehicle with an engine that is switchable between an all-cylinder mode and a reduced-cylinder mode.

The first engine operating range may be an engine operating range between a predetermined first engine speed and a predetermined second engine speed that is above the first engine speed, and the torque transmission assembly is in the noise generating state in the all-cylinder operating mode in the first engine operating range. The second engine operating range may be an engine operating range between the first engine speed and a predetermined third engine speed that is above the second engine speed. In the reduced-cylinder operating mode, within a part of the second engine operating range where the engine speed is below an engine speed at which the torque ratio, applied to the auxiliary drive wheels and increased to suppress the noise generation, takes a largest value, the controller that executes the noise suppression module may cause the torque adjusting device to increase the torque applied to the auxiliary drive wheels to be larger than a value to which the torque ratio applied to the auxiliary drive wheels is increased to suppress the noise generation.

With the above configuration, even when a driver rapidly steps on the accelerator while changing operating ranges or switching to an all-cylinder mode from the reduced-cylinder mode, since the torque transmission assembly is prevented from being in a noise-generating state before the torque to the auxiliary drive wheels is increased to suppress noise, the noise suppression can be further enhanced.

When a request for request for shifting the operating mode of the engine to the all-cylinder operating mode is issued in the reduced-cylinder operating mode within a part of the second engine operating range overlapping with the first engine operating range, the operating mode may be shifted to the all-cylinder operating mode after the controller that executes the noise suppression module causes the torque adjusting device to adjust the torque ratio applied to the auxiliary drive wheels to an increased value of the torque ratio applied to the auxiliary drive wheels to suppress the noise generation within the first engine operating range in the all-cylinder operating mode.

With the above configuration, since the torque transmission assembly is prevented from being in a noise-generating state before the torque to the auxiliary drive wheels is increased to suppress noise, the noise suppression can be further enhanced.

When a request for shifting the operating mode of the engine to the reduced-cylinder operating mode is issued in the all-cylinder operating mode within a part of the second engine operating range on the higher engine speed side of the first engine operating range, the operating mode may be shifted to the reduced-cylinder operating mode after the controller that executes the noise suppression module causes the torque adjusting device to adjust the torque ratio applied to the auxiliary drive wheels to an increased value of the torque ratio applied to the auxiliary drive wheels to suppress the noise generation within the second engine operating range in the reduced-cylinder operating mode.

With the above configuration, since the torque transmission assembly is prevented from being in a noise-generating state before the torque to the auxiliary drive wheels is increased to suppress noise, the noise suppression can be further enhanced.

The four-wheel drive vehicle may further comprise an all-cylinder operation damper configured to suppress the noise generation at the torque transmission assembly in the all-cylinder operating mode.

With the above configuration, noise generation can be suppressed in the all-cylinder mode via a second damper in conjunction with a first damper that suppresses noise in the reduced-cylinder mode.

The all-cylinder operation damper may be a torsional damper configured to shift, to a lower engine speed side, the engine operating range where the torque transmission assembly is in the noise generating state in the all-cylinder operating mode.

With the above configuration, by using the claimed torsional damper in the all-cylinder mode when the torque transmission assembly is in a noise generating state, noise generation can be effectively suppressed in the all-cylinder mode, since the torsional damper can shift the operating range to the engine speeds in the practical range of the engine. Compared to situations where the torque to the auxiliary drive wheels is increased when the torque transmission assembly is in a noise-generating state in the all-cylinder mode, it is possible to better prevent the degradation of fuel economy while suppressing noise generation in the all-cylinder mode.

A four-wheel drive vehicle may comprise an engine configured with an operating mode that is switchable between an all-cylinder operating mode and a reduced-cylinder operating mode; a torque transmission assembly configured to transmit an output torque of the engine to main drive wheels and auxiliary drive wheels; a torque ratio adjusting device included in the torque transmission assembly, configured to adjust a ratio of the output torque that is distributed to the auxiliary drive wheels so as to suppress a generation of noise at the torque transmission assembly; and a damper configured to further suppress the generation of noise at the torque transmission assembly in the reduced-cylinder operating mode.

With the above configuration, it is possible to minimize variations in torque by the torque transmission assembly and damper in a noise generating state of a four-wheel drive vehicle in the reduced-cylinder mode, while also suppressing noise generation in the reduced-cylinder mode.

DETAILED DESCRIPTION OF EMBODIMENTS

Hereinafter, embodiments of the present invention are described with reference to the appended drawings.

Figure 1:
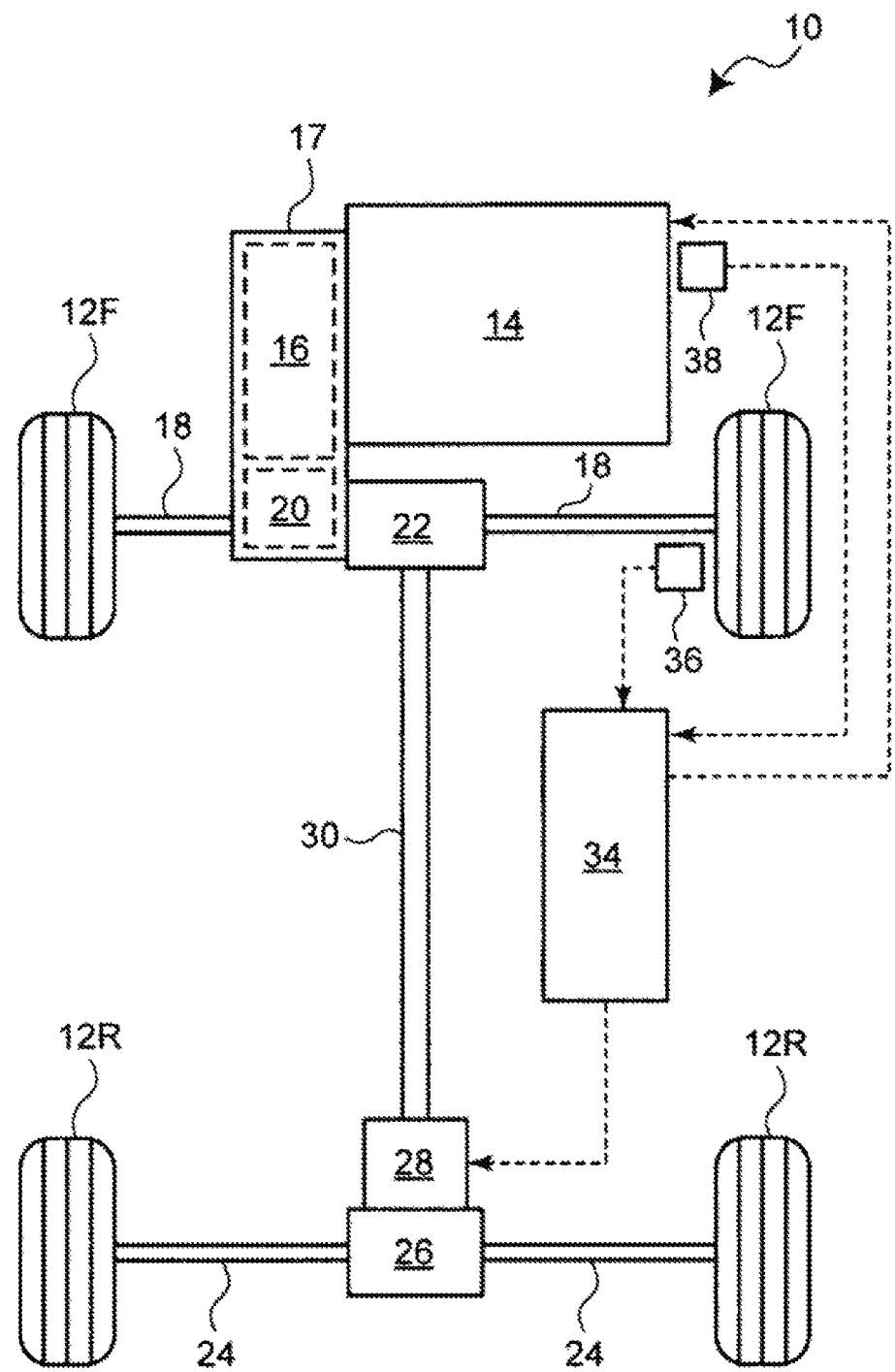
FIG. 1 is a schematic view of a four-wheel drive vehicle according to a first embodiment of the present invention.

FIG. 1 is a schematic view of a four-wheel drive vehicle 10 according to a first embodiment of the present invention. As illustrated in FIG. 1, the four-wheel drive vehicle 10 of the first embodiment includes an engine 14 as a drive source, a transmission case 17 containing a transmission 16 for transmitting an output torque of the engine 14 to left and right front-wheels 12F and left and right rear-wheels 12R, and a front-wheel differential device 20 for transmitting a drive force (power) from the transmission 16 to the left and right front-wheels 12F via an axle 18, a transfer case 22 for extracting a drive force to be applied to the left and right rear-wheels 12R, and a rear-wheel differential device 26 for transmitting the drive force from the transfer case 22 to the left and right rear-wheels 12R via an axle 24.

The engine 14 is a multi-cylinder engine having a plurality of cylinders, specifically, a four-cylinder engine having four cylinders, and capable of switching its operating mode between an all-cylinder operating mode where the four cylinders are operated and a reduced-cylinder operating mode where operation of two of the four cylinders is suspended while the other two cylinders are operated.

The transfer case 22 and the rear-wheel differential device 26 are coupled to each other via a propeller shaft 30 extending in front-and-rear directions of the vehicle and a coupling 28. An output shaft of the transfer case 22 is coupled to one end of the propeller shaft 30, and the other end of the propeller shaft 30 is coupled to an input shaft of the coupling 28, and an output shaft of the coupling 28 is coupled to an input shaft of the rear-wheel differential device 26.

The transfer case 22 has a pair of bevel gears meshed with each other (not illustrated), specifically, a bevel gear provided on an extended line of a central axis of the front-wheel differential device 20 and a bevel gear provided on an extended line of a central axis of the propeller shaft 30, to transmit power from the front-wheel differential device 20 of which central axis extends in a width direction of the vehicle, to the propeller shaft 30 extending in the front-and-rear directions of the vehicle.

As the coupling 28, for example, an electromagnetic type coupling is used, and the coupling 28 adjusts a ratio of the output torque of the engine 14 distributed to the rear wheels 12R. In the four-wheel drive vehicle 10, the torque to the front wheels 12F and the rear wheels 12R is adjustable within a range between 100:0 and 50:50 (front wheels:rear wheels).

In this embodiment, the front wheels 12F are the main drive wheels and the rear wheels 12R are the auxiliary drive wheels. The transmission 16, the front-wheel differential device 20, the axle 18, the transfer case 22, the propeller shaft 30, the coupling 28, the rear-wheel differential device 26, and the axle 24 constitute a torque transmission assembly for transmitting the output torque of the engine 14 to the front wheels 12F and the rear wheels 12R. The coupling 28 constitutes a torque ratio adjusting device for adjusting the ratio of the output torque of the engine 14 distributed to the rear wheels 12R.

The four-wheel drive vehicle 10 includes an accelerator opening sensor 36 for detecting a stepping amount (accelerator opening) of an accelerator pedal by a driver, an engine speed sensor 38 for detecting a speed of the engine 14, and a controller 34 for controlling operations of the engine 14 and the coupling 28, for example.

The controller 34 receives various information as signals from the accelerator opening sensor 36 and the engine speed sensor 38, for example. The controller 34 controls the operations of the engine 14, and the coupling 28, for example, based on the received information. Note that a substantial part of the controller 34 is a microcomputer comprising a microprocessor including associated non-volatile memory for data storage and volatile memory for temporary storage of data during data processing.

The controller 34 stores an operating mode map indicating a relationship between the engine speed and the accelerator opening with respect to the operating modes, specifically, with respect to the all-cylinder operating mode and the reduced-cylinder operating mode. The controller 34 switches the operating mode of the engine 14 between the all-cylinder operating mode and the reduced-cylinder operating mode based on the relationship between the engine speed and the accelerator opening by using the operating mode map.

Further, in both the all-cylinder and reduced-cylinder operating modes, the controller 34 increases the torque to the rear wheels 12R to suppress the generation of noise at the torque transmission assembly, or specifically, to suppress the generation of noise at a drivetrain from the bevel gear of the transfer case 22 provided in the extended line of the central axis of the front-wheel differential device 20 to the rear wheels 12R, the drivetrain including the propeller shaft 30 and the rear-wheel differential device 26, for example.

In the all-cylinder operating mode, within a first engine operating range where the torque transmission assembly (i.e., the drivetrain) is in a noise generating state in the all-cylinder operating mode, the controller 34 increases the torque to the rear wheels 12R to suppress noise generation. In the reduced-cylinder operating mode, within a second engine operating range where the torque transmission assembly (i.e., the drivetrain) is in the noise generating state in the reduced-cylinder operating mode, the controller 34 increases the torque to the rear wheels 12R via the coupling 28 to suppress noise generation.

Thus, the controller 34 changes the torque to the rear wheels 12R according to the operating ranges where the torque transmission assembly (i.e., the drivetrain) is in the noise generating state in the all-cylinder and reduced-cylinder operating modes, respectively.

Figure 2A:
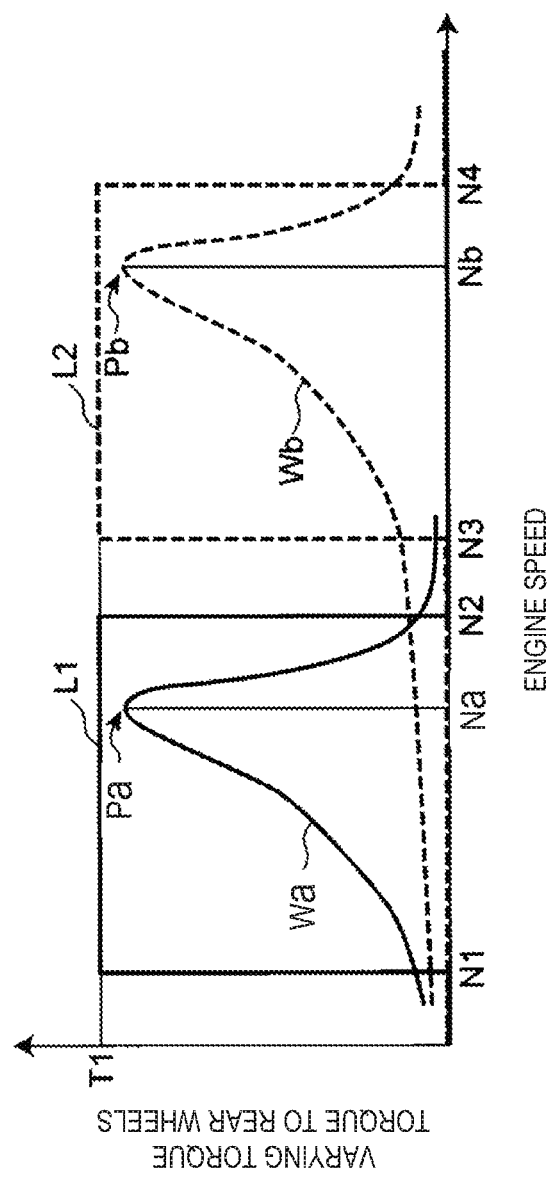
FIG. 2A is a chart illustrating a relationship between an engine speed and a varying torque of a drivetrain or a torque applied to the rear wheels, in the four-wheel drive vehicle according to the first example of the first embodiment.

FIG. 2A is a chart illustrating a relationship between the engine speed and a varying torque of the drivetrain or the torque applied to the rear wheels, in the four-wheel drive vehicle according to the first example of the first embodiment. In FIG. 2A, the engine speed is indicated along the horizontal axis, the varying torque of the drivetrain and the torque applied to the rear wheels 12R are indicated in the vertical axis, a waveform of the varying torque of the drivetrain in the all-cylinder operating mode is indicated by the solid line Wa, and a waveform of the varying torque of the drivetrain in the reduced-cylinder operating mode is indicated by the dashed line Wb.

As illustrated in FIG. 2A, the waveform Wa of the varying torque in the all-cylinder operating mode has a peak Pa at a predetermined engine speed Na, and the waveform Wb of the varying torque in the reduced-cylinder operating mode has a peak Pb at a predetermined engine speed Nb that is higher than the engine speed Na.

Figure 19:
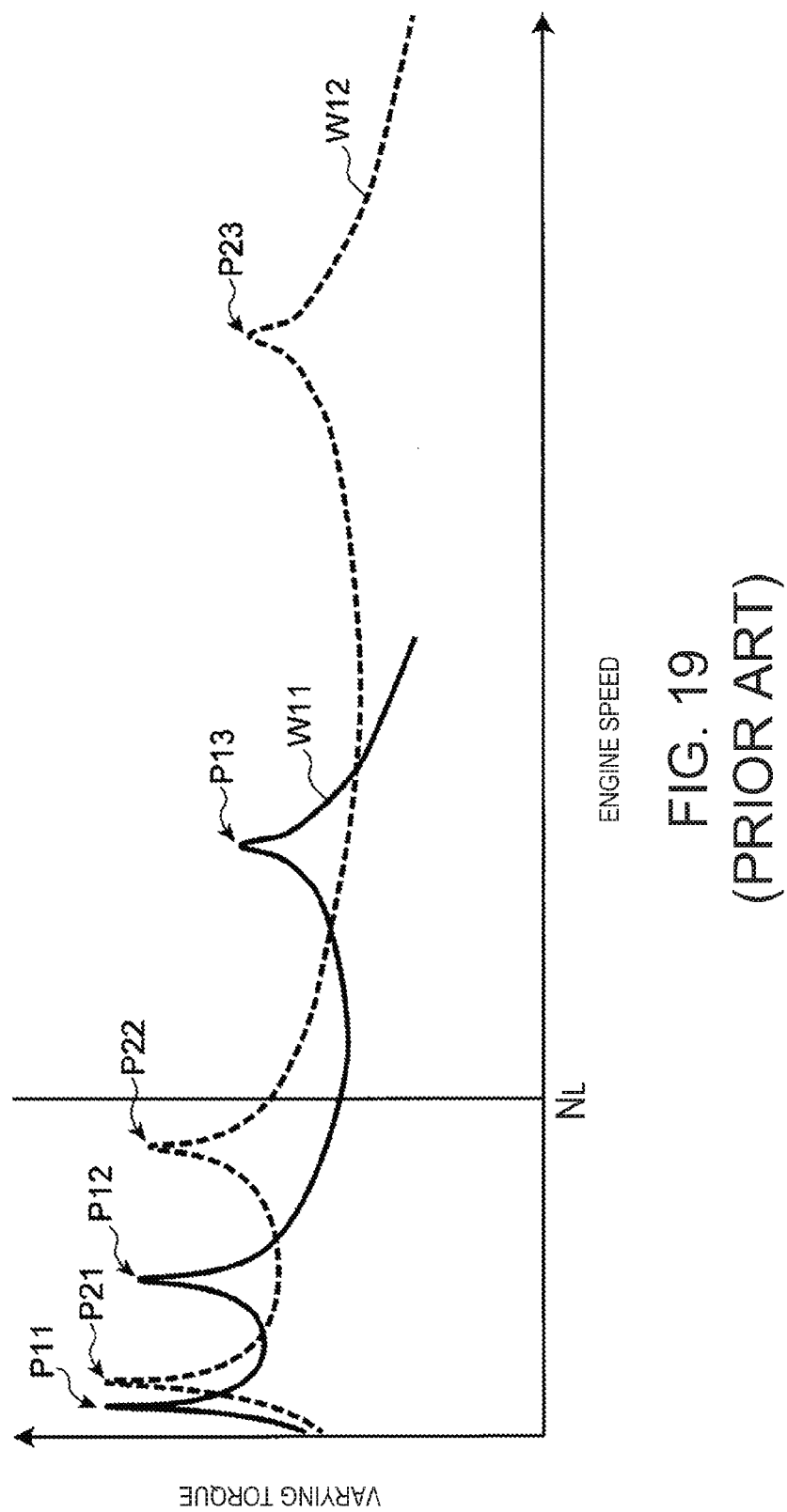
FIG. 19 is a chart illustrating relationships between an engine speed and a varying torque of a drivetrain, in an all-cylinder operating mode and a reduced-cylinder operating mode of a four-wheel drive vehicle.

Note that the illustration in FIG. 2A covers engine speeds within a practical range of the engine 14, and the waveforms Wa and Wb of the varying torque correspond to waveforms W11 and W12 of the varying torque in FIG. 19, and the peaks Pa and Pb correspond to peaks P13 and P23 in FIG. 19, respectively. The practical range of the engine 14 is a range higher than or equal to an idling speed, for example.

In the controller 34, an operating range that includes the engine speed Na corresponding to the peak Pa of the waveform Wa of the varying torque and is between a predetermined first engine speed N1 and a predetermined second engine speed N2 that is higher than the first engine speed N1 is preset and stored as the first engine operating range where the torque transmission assembly is in the noise generating state in the all-cylinder operating mode.

In the controller 34, an operating range that includes the engine speed Nb corresponding to the peak Pb of the waveform Wb of the varying torque and is between a predetermined third engine speed N3 and a predetermined fourth engine speed N4 that is higher than the third engine speed N3 is preset and stored as the second engine operating range where the torque transmission assembly is in the noise generating state in the reduced-cylinder operating mode.

In the all-cylinder operating mode, the controller 34 performs a noise suppressing control for the all-cylinder operating mode within the first engine operating range (i.e., the operating range between the first and second engine speeds N1 and N2). Specifically, to suppress noise generation, the controller 34 increases the torque applied to the rear wheels 12R to a torque T1, indicated by the solid line L1 in FIG. 2A, which exceeds the varying torque at the peak Pa of the waveform Wa.

Further, in the reduced-cylinder operating mode, the controller 34 performs a noise suppressing control for the reduced-cylinder operating mode within the second engine operating range (i.e., the operating range between the third and fourth engine speeds N3 and N4). Specifically, to suppress noise generation, the controller 34 increases the torque applied to the rear wheels 12R to the torque T1, indicated by the dashed line L2 in FIG. 2A, which exceeds the varying torque at the peak Pb of the waveform Wb.

In addition to the waveforms Wa and Wb of the varying torque of the drivetrain of the four-wheel drive vehicle 10, relationships between the engine speed and the torque applied to the rear wheels 12R for the noise suppressing controls in the all-cylinder and reduced-cylinder operating modes, respectively, are also preset and stored in the controller 34.

Figure 2B:
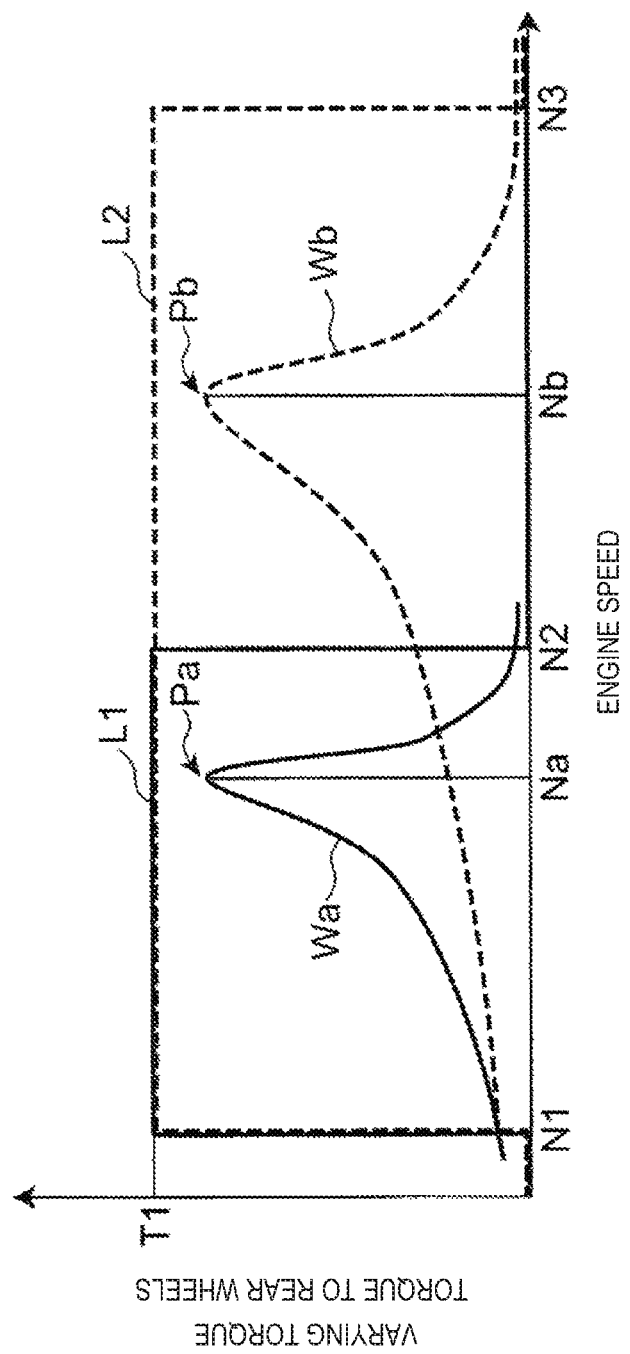
FIG. 2B is a chart illustrating a relationship between an engine speed and a varying torque of a drivetrain or a torque applied to the rear wheels, in the four-wheel drive vehicle according to the second example of the first embodiment.

Referring to FIG. 2B, a chart is illustrated showing a relationship between the engine speed and a varying torque of the drivetrain or the torque applied to the rear wheels, in the four-wheel drive vehicle according to a second example of the first embodiment. Since this relationship shown in FIG. 2B is generally similar to that shown in FIG. 2A, the detailed description thereof is abbreviated here for the sake of brevity. Notably, the relationship shown in FIG. 2B lacks a predetermined fourth engine speed, and the second engine operating range is redefined on the higher-engine speed side of the first engine operating range, i.e. the operating range between the first and third engine speeds N1 and N3.

In the controller 34 in the second example, an operating range that includes the engine speed Nb corresponding to the peak Pb of the waveform Wb of the varying torque and is between the first engine speed N1 and a predetermined third engine speed N3 that is higher than the second engine speed N2 is preset and stored as the second engine operating range that is on the higher engine speed side of the first engine operating range and includes the operating range where the torque transmission assembly is in the noise generating state in the reduced-cylinder operating mode.

In the reduced-cylinder operating mode, the controller 34 performs a noise suppressing control for the reduced-cylinder operating mode within the second engine operating range (i.e., the operating range between the first and third engine speeds N1 and N3). Specifically, to suppress noise generation, the controller 34 increases, via the coupling 28, the torque applied to the rear wheels 12R to the torque T1, indicated by the dashed line L2 in FIG. 2B, which exceeds the varying torque at the peak Pb of the waveform Wb.

Note that the controller 34 executes a noise suppression module for increasing, via the coupling 28, the torque applied to the rear wheels 12R within the first engine operating range in the all-cylinder operating mode and within the second engine operating range in the reduced-cylinder operating mode, so as to suppress noise generation. The noise suppression module it will be understood is a set of software instructions stored in non-volatile memory of the controller and executed by the controller's microprocessor to control components of the vehicle such as coupling 18 to perform the functions described herein.

As described above, the four-wheel drive vehicle 10 of this embodiment includes the controller 34 that executes the noise suppression module for increasing the torque applied to the rear wheels 12R in the all-cylinder operating mode within the first engine operating range where the torque transmission assembly is in the noise generating state in the all-cylinder operating mode, so as to suppress noise generation. To suppress noise generation in the reduced-cylinder operating mode, the controller 34 that executes the noise suppression module increases the torque applied to the rear wheels 12R within the second engine operating range that is on the higher engine speed side of the first engine operating range (in the second example) and includes the operating range where the torque transmission assembly is in the noise generating state in the reduced-cylinder operating mode.

Since the torque applied to the rear wheels 12R is increased within the respective operating ranges where the torque transmission assembly is in the noise generating state in the all-cylinder and reduced-cylinder operating modes so as to suppress noise generation, in the four-wheel drive vehicle 10 provided with the engine 14 of which operating mode is switchable between the all-cylinder and reduced-cylinder operating modes, noise generation can be suppressed in the all-cylinder and reduced-cylinder operating modes.

Note that in this embodiment, the second engine operating range is preset to be the operating range between the first and third engine speeds N1 and N3. However, it may alternatively be an operating range between the second and third engine speeds N2 and N3, or an operating range where the varying torque of the torque transmission assembly is above a predetermined value, and these operating ranges may include the engine speed Na. Moreover, the first engine operating range may also be preset to be a predetermined operating range including the engine speed Na.

Figure 3:
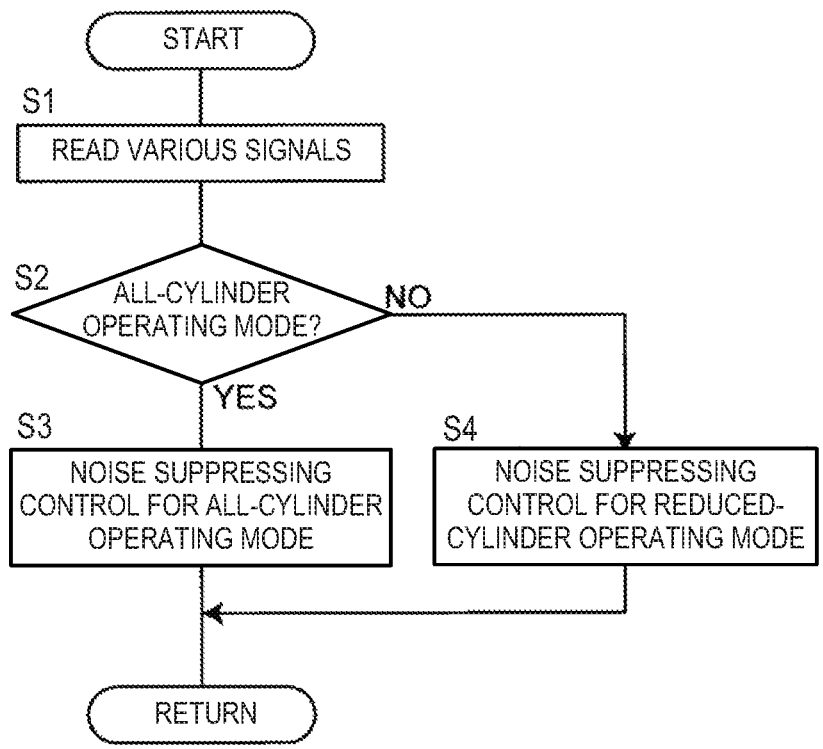
FIG. 3 is a flowchart illustrating a control of the four-wheel drive vehicle.

FIG. 3 is a flowchart illustrating a control of the four-wheel drive vehicle. The noise suppressing control for suppressing noise generation at the torque transmission assembly of the four-wheel drive vehicle 10 is performed by the controller 34. As illustrated in FIG. 3, the controller 34 first reads signals detected by components provided for the four-wheel drive vehicle 10, specifically, various signals of the accelerator opening, the engine speed, for example. (S1).

Next at S2, whether or not the engine 14 is in the all-cylinder operating mode is determined based on the engine speed and the accelerator opening by using the operating mode map indicating the relationship between the engine speed and the accelerator opening with respect to the operating modes.

If the determination result of S2 is positive (YES), in other words, the engine 14 is determined to be in the all-cylinder operating mode, the noise suppressing control for the all-cylinder operating mode is performed (S3), specifically, within the first engine operating range in the all-cylinder operating mode, where the torque applied to the rear wheels 12R is increased to the torque T1 which exceeds the varying torque at the peak Pa of the waveform Wa.

On the other hand, if the determination result of S2 is negative (NO), in other words, the engine 14 is determined to be in the reduced-cylinder operating mode and not the all-cylinder operating mode, the noise suppressing control for the reduced-cylinder operating mode is performed (S4), specifically, within the second engine operating range in the reduced-cylinder operating mode, where the torque applied to the rear wheels 12R is increased to the torque T1 which exceeds the varying torque at the peak Pb of the waveform Wb.

The controller 34 further controls the operation of the engine 14 by switching the operating mode between the all-cylinder and reduced-cylinder operating modes based on the engine speed and the accelerator opening by using the operating mode map.

Note that the controller 34 is configured to execute the noise suppression module for changing (e.g., by increasing) the torque applied to the rear wheels 12R to suppress noise generation at the torque transmission assembly, according to the operating ranges where the torque transmission assembly is in the noise generating state in the all-cylinder and reduced-cylinder operating modes, respectively.

As described above, the four-wheel drive vehicle 10 of this embodiment includes the controller 34 that executes the noise suppression module for increasing the torque applied to the rear wheels 12R via the coupling 28 in the all-cylinder and reduced-cylinder operating modes to suppress noise generation at the torque transmission assembly for transmitting the output torque of the engine 14 to the front and rear wheels 12F and 12R. Specifically, the controller 34 that executes the noise suppression module changes the torque applied to the rear wheels 12R according to the operating ranges where the torque transmission assembly is in the noise generating state in the all-cylinder and reduced-cylinder operating modes, respectively.

Since the torque applied to the rear wheels 12R, in the all-cylinder operating mode, is increased to suppress noise generation within the operating range where the torque transmission assembly is in the noise generating state in the all-cylinder operating mode, and the torque applied to the rear wheels 12R, in the reduced-cylinder operating mode, is increased to suppress noise generation within the operating range where the torque transmission assembly is in the noise generating state in the reduced-cylinder operating mode, compared to a case where the torque applied to the rear wheels 12R is not increased within the operating ranges where the torque transmission assembly is in the noise generating state in the all-cylinder and reduced-cylinder operating modes, respectively, noise generation can be suppressed in the four-wheel drive vehicle 10 in the all-cylinder and reduced-cylinder operating modes while suppressing degradation of fuel economy.

In this embodiment, the first engine operating range is preset to be the operating range between the first and second engine speeds N1 and N2. However, it may alternatively be an operating range where the varying torque of the torque transmission assembly in the all-cylinder operating mode is greater than or equal to a predetermined value, and it may include the engine speed Na.

Further, the second engine operating range is preset to be the operating range between the third and fourth engine speeds N3 and N4. However, it may alternatively be an operating range where the varying torque of the torque transmission assembly in the reduced-cylinder operating mode is greater than or equal to a predetermined value, and it may include the engine speed Nb.

Further in this embodiment, in both of the all-cylinder and reduced-cylinder operating modes, the torque applied to the rear wheels 12R is increased to the same torque T1. However, the torque applied to the rear wheels 12R may alternatively be increased to different torques in the all-cylinder and reduced-cylinder operating modes according to the varying torques of the drivetrain at the peaks Pa and Pb of the waveforms Wa and Wb.

Figure 4A:
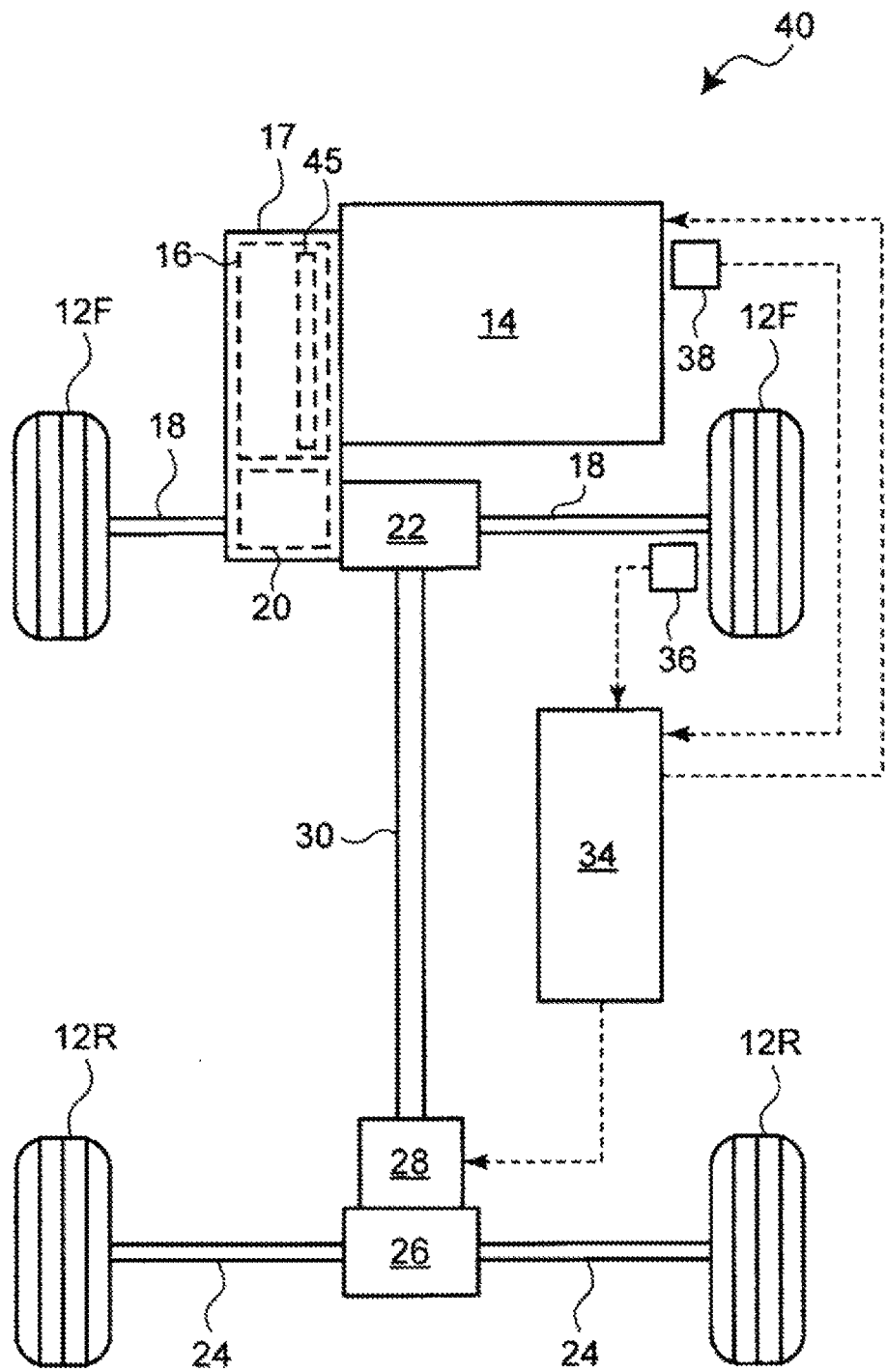
FIG. 4A is a schematic view of a four-wheel drive vehicle according to a second embodiment of the present invention.

FIG. 4A is a schematic view of a four-wheel drive vehicle 40 according to a second embodiment of the present invention. The four-wheel drive vehicle 40 of the second embodiment is substantially the same as the four-wheel drive vehicle 10 of the first embodiment except that the noise suppression module for suppressing noise generation at the torque transmission assembly in the reduced-cylinder operating mode is different. Therefore, description of the similar configurations between the first and second embodiments is omitted.

As illustrated in FIG. 4A, in the four-wheel drive vehicle 40 of the second embodiment, the transmission 16 includes a damper 45 for suppressing, in the reduced-cylinder operating mode, noise generation at the torque transmission assembly, specifically, the drivetrain from the bevel gear of the transfer case 22 provided in the extended line of the central axis of the front-wheel differential device 20 to the rear wheels 12R, including the propeller shaft 30 and the rear-wheel differential device 26, for example.

As the damper 45, a centrifugal pendulum absorber for attenuating vibration by oscillation of a pendulum may be used, and the pendulum absorber 45 may reduce the varying torque of the torque transmission assembly, specifically the drivetrain, in the reduced-cylinder operating mode.

Figure 4B:
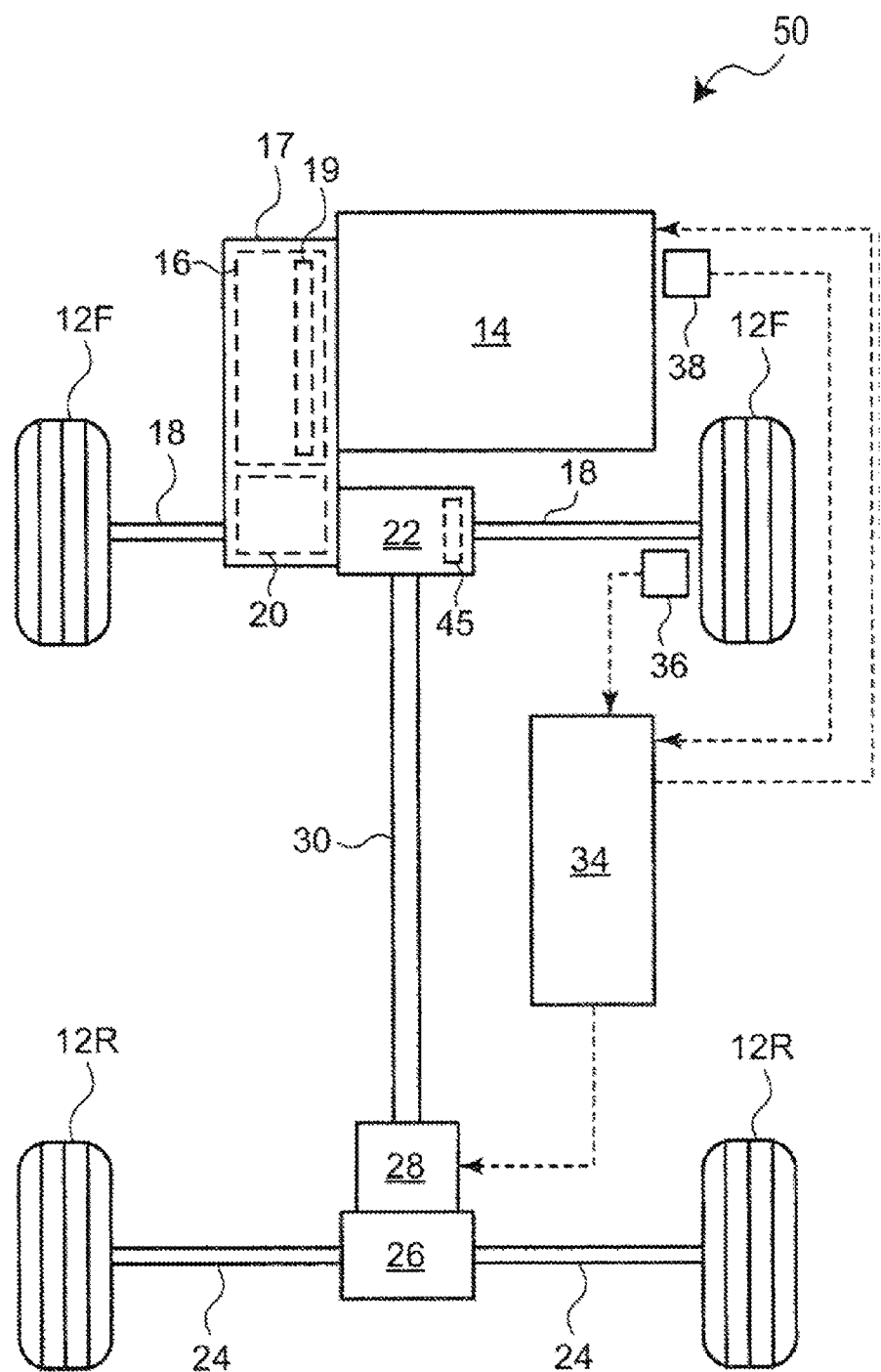
FIG. 4B is a schematic view of a four-wheel drive vehicle according to a third embodiment of the present invention.

Referring to FIG. 4B, a schematic view of a four-wheel drive vehicle 50 is shown according to a third embodiment of the present invention. The four-wheel drive vehicle of the third embodiment is substantially the same as the four-wheel drive vehicle 10 of the first embodiment except that the noise suppression module for suppressing noise generation at the torque transmission assembly in the all-cylinder operating mode is different. Therefore, description of the similar configurations between the first and third embodiments is omitted.

As illustrated in FIG. 4B, also in the four-wheel drive vehicle 50 of the third embodiment, the transmission 16 includes a damper 19 for suppressing, in the reduced-cylinder operating mode, noise generation at the torque transmission assembly, specifically, the drivetrain from the bevel gear of the transfer case 22 provided in the extended line of the central axis of the front-wheel differential device 20 to the rear wheels 12R, including the propeller shaft 30 and the rear-wheel differential device 26, for example.

Further in this embodiment, the transfer case 22 includes a damper 45 for suppressing, in the all-cylinder operating mode, noise generation at the torque transmission assembly, specifically, the drivetrain from the bevel gear of the transfer case 22 provided on the extended line of on the central axis of the front-wheel differential device 20 to the rear wheels 12R, including the propeller shaft 30 and the rear-wheel differential device 26, for example.

Figure 4C:
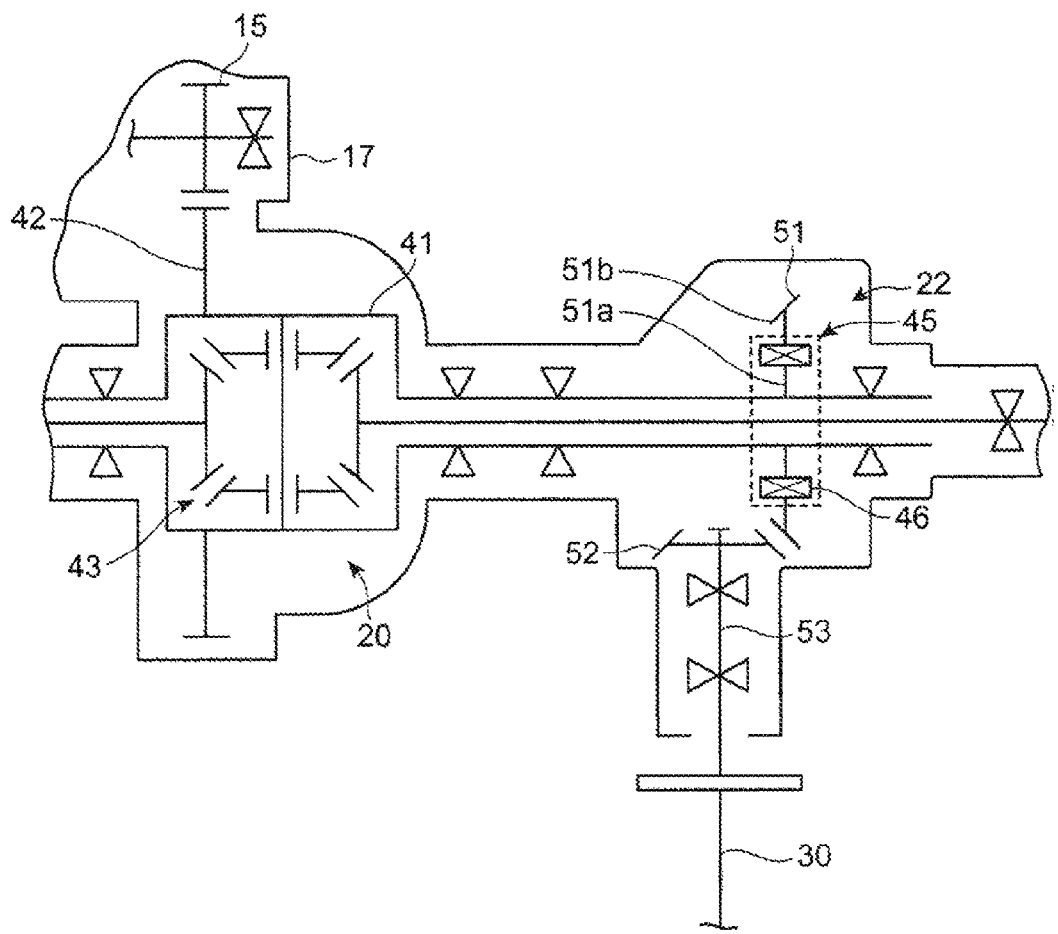
FIG. 4C is a schematic view of a front-wheel differential device and a transfer case of a four-wheel drive vehicle according to the third embodiment of the present invention.

As illustrated in FIG. 4C, the front-wheel differential device 20 includes a differential case 41, an input gear 42 provided at an outer circumference of the differential case 41, a differential mechanism 43 provided inside the differential case 41. The input gear 42 is constantly meshed with an output gear 15 of the transmission 16. The drive force from the transmission 16 is applied to the differential case 41 via the input gear 42 and then is further transmitted by the differential mechanism 43 inside the differential case 41 to the left and right front-wheels 12F via the axle 18.

The transfer case 22 is fixed to the differential case 41 in the extended line of the central axis of the front-wheel differential device 20 and has a first bevel gear 51 for rotating around the central axis of the front-wheel differential device 20, a second bevel gear 52 provided in the extended line of the central axis of the propeller shaft 30 and constantly meshed with the first bevel gear 51, and an output shaft 53 coupled to the second bevel gear 52. The output shaft 53 is coupled to the propeller shaft 30. The propeller shaft 30 rotates in conjunction with the rotation of the differential case 41 via the pair of bevel gears 51 and 52, regardless of the fastened state of the coupling 28.

As the damper 45 (all-cylinder operation damper), a torsional damper is used. The torsional damper 45 is provided within a driving path for driving the rear wheels 12R. Specifically, the first bevel gear 51 has an inner-circumferential gear part 51a on the differential case 41 side, and an outer-circumferential gear part 51b spline-fitted to the inner-circumferential gear part 51a. The torsional damper 45 is constructed as an elastic annular member 46 made of rubber, disposed at the spline-fitted portion of the inner-circumferential gear part 51a and the outer-circumferential gear part 51b of the first bevel gear 51.

The torsional damper 45 shifts to the lower engine speed side the peak Pa of the waveform of the varying torque of the torque transmission assembly, specifically, the drivetrain from the bevel gear 51 of the transfer case 22 provided in the extended line of the central axis of the front-wheel differential device 20 to the rear wheels 12R, including the propeller shaft 30 and the rear-wheel differential device 26, for example.

Figure 5:
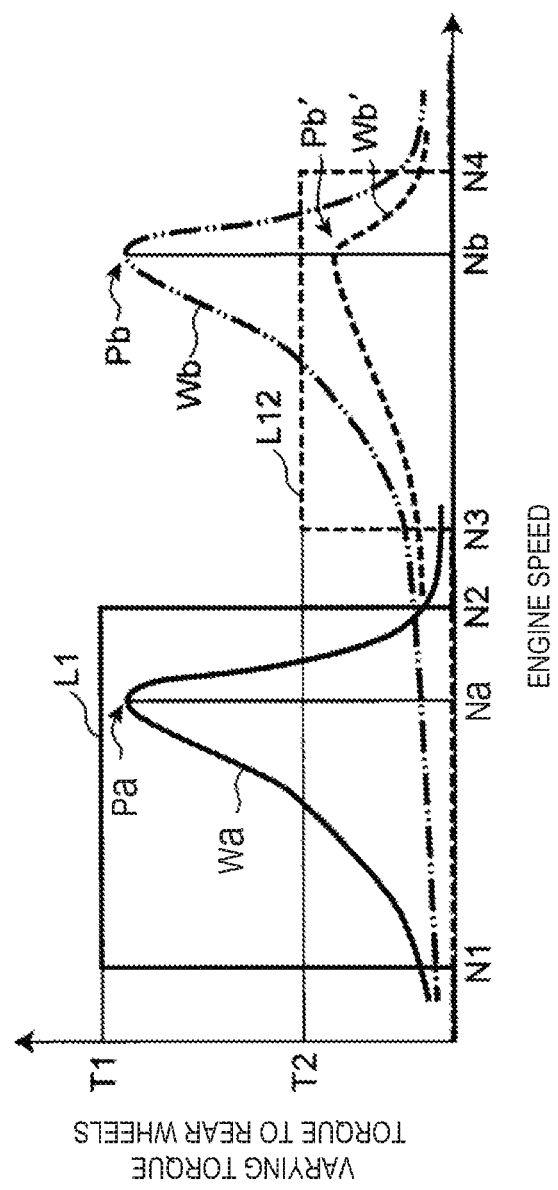
FIG. 5 is a chart illustrating a relationship between an engine speed and a varying torque of a drivetrain or a torque applied to the rear wheels, in the four-wheel drive vehicle.

FIG. 5 is a chart illustrating a relationship between the engine speed of the four-wheel drive vehicle 40 and the varying torque of the drivetrain or the torque applied to the rear wheels. In FIG. 5, a waveform of the varying torque of the drivetrain of the four-wheel drive vehicle 40 in the all-cylinder operating mode is indicated by the solid line Wa, and waveforms of the varying torque of the drivetrain in the reduced-cylinder operating mode are indicated by the two-dotted chain line Wb and the dashed line Wb'.

The dashed line Wb' indicates the waveform of the varying torque of the four-wheel drive vehicle 40 in the reduced-cylinder operating mode, and the two-dotted chain line Wb indicates the waveform of the varying torque of the four-wheel drive vehicle 10 which is configured substantially the same as the four-wheel drive vehicle 40 except that the transmission 16 of the four-wheel drive vehicle 10 does not include the pendulum absorber 45.

As illustrated in FIG. 5, the waveform Wa of the varying torque in the all-cylinder operating mode has a peak Pa at a predetermined engine speed Na, and the waveforms Wb and Wb' of the varying torque in the reduced-cylinder operating mode have peaks Pb and Pb', respectively, at a predetermined engine speed Nb that is higher than the engine speed Na.

The peak Pb' of the waveform Wb' of the varying torque in the reduced-cylinder operating mode is below the peak Pb of the waveform Wb of the varying torque in the reduced-cylinder operating mode, and it can be understood that the varying torque of the drivetrain can be reduced in the reduced-cylinder operating mode by providing the pendulum absorber 45 in the transmission 16.

Also in this embodiment, in the controller 34, an operating range that includes the engine speed Na corresponding to the peak Pa of the waveform Wa of the varying torque and is between a predetermined first engine speed N1 and a predetermined second engine speed N2 is preset and stored as a first engine operating range where the torque transmission assembly is in the noise generating state in the all-cylinder operating mode.

Further in the controller 34, an operating range that includes the engine speed Nb corresponding to the peak Pb' of the waveform Wb' of the varying torque and is between a predetermined third engine speed N3 and a predetermined fourth engine speed N4 is preset and stored as a second engine operating range where the torque transmission assembly is in the noise generating state in the reduced-cylinder operating mode.

In the all-cylinder operating mode, the controller 34 performs the noise suppressing control for the all-cylinder operating mode within the first engine operating range (i.e., the operating range between the first and second engine speeds N1 and N2). Specifically, to suppress noise generation, the controller 34 increases the torque applied to the rear wheels 12R to a torque T1, indicated by the solid line L1 in FIG. 5, which exceeds the varying torque at the peak Pa of the waveform Wa.

Further, in the reduced-cylinder operating mode, the controller 34 performs the noise suppressing control for the reduced-cylinder operating mode within the second engine operating range (i.e., the operating range between the third and fourth engine speeds N3 and N4). Specifically, to suppress noise generation, the controller 34 increases the torque applied to the rear wheels 12R to a torque T2, indicated by the dashed line L12 in FIG. 5, which exceeds the varying torque at the peak Pb' of the waveform Wb' and is below the torque T1.

In this embodiment, the controller 34 adjusts the torque applied to the rear wheels 12R, which is increased to suppress noise generation, to be smaller in the reduced-cylinder operating mode than in the all-cylinder operating mode.

Also in this embodiment, whether or not the engine is in the all-cylinder operating mode is determined by the controller 34. If the engine is determined to be in the all-cylinder operating mode, the noise suppressing control for the all-cylinder operating mode is performed, and if the engine is determined to be in the reduced-cylinder operating mode, the noise suppressing control for the reduced-cylinder operating mode is performed. Further, the controller 34 controls the operation of the engine 14 by switching its operating mode between the all-cylinder and reduced-cylinder operating modes based on the engine speed and the accelerator opening by using the operating mode map.

In the controller 34, in addition to the waveforms Wa and Wb' of the varying torque of the drivetrain of the four-wheel drive vehicle 40, relationships between the engine speed and the torque ratios to the rear wheels 12R for the noise suppressing controls in the all-cylinder and reduced-cylinder operating modes, respectively, are also preset and stored.

As described above, the four-wheel drive vehicle 40 of this embodiment also includes the controller 34 that executes the noise suppression module for increasing the torque applied to the rear wheels 12R via the coupling 28 in the all-cylinder and reduced-cylinder operating modes to suppress noise generation at the torque transmission assembly for transmitting the output torque of the engine 14 to the front and rear wheels 12F and 12R. The controller 34 that executes the noise suppression module changes the torque applied to the rear wheels 12R according to the operating ranges where the torque transmission assembly is in the noise generating state in the all-cylinder and reduced-cylinder operating modes, respectively.

Since the torque applied to the rear wheels 12R, in the all-cylinder operating mode, is increased to suppress noise generation within the operating range where the torque transmission assembly is in the noise generating state in the all-cylinder operating mode, and the torque applied to the rear wheels 12R, in the reduced-cylinder operating mode, is increased to suppress noise generation within the operating range where the torque transmission assembly is in the noise generating state in the reduced-cylinder operating mode, compared to a case where the torque applied to the rear wheels 12R is not increased within the operating ranges where the torque transmission assembly is in the noise generating state in the all-cylinder and reduced-cylinder operating modes, noise generation can be suppressed in the four-wheel drive vehicle 40 in the all-cylinder and reduced-cylinder operating modes while suppressing degradation of fuel economy.

Further, the four-wheel drive vehicle 40 includes the damper 45 for suppressing, in the reduced-cylinder operating mode, noise generation at the torque transmission assembly, and the controller 34 that executes the noise suppression module adjusts the torque applied to the rear wheels 12R which is increased to suppress noise generation, to be lower in the reduced-cylinder operating mode than in the all-cylinder operating mode. Thus, the torque applied to the rear wheels 12R which is increased to suppress noise generation in the reduced-cylinder operating mode can be reduced by the damper, and the degradation of fuel economy can be suppressed even more.

Figure 6A:
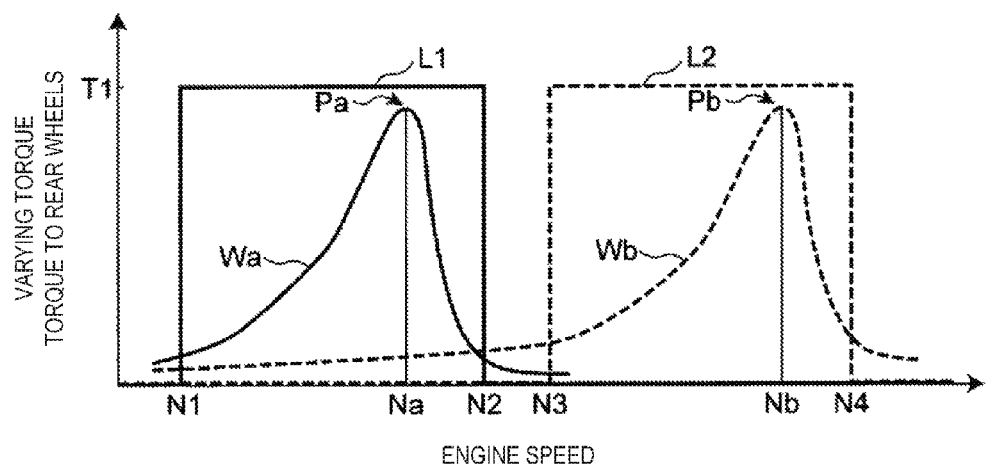
FIGS. 6A and 6B are charts illustrating relationships between an engine speed and a varying torque of a drivetrain or a torque applied to the rear wheels, in a four-wheel drive vehicle according to a fourth embodiment of the present invention.
Figure 6B:
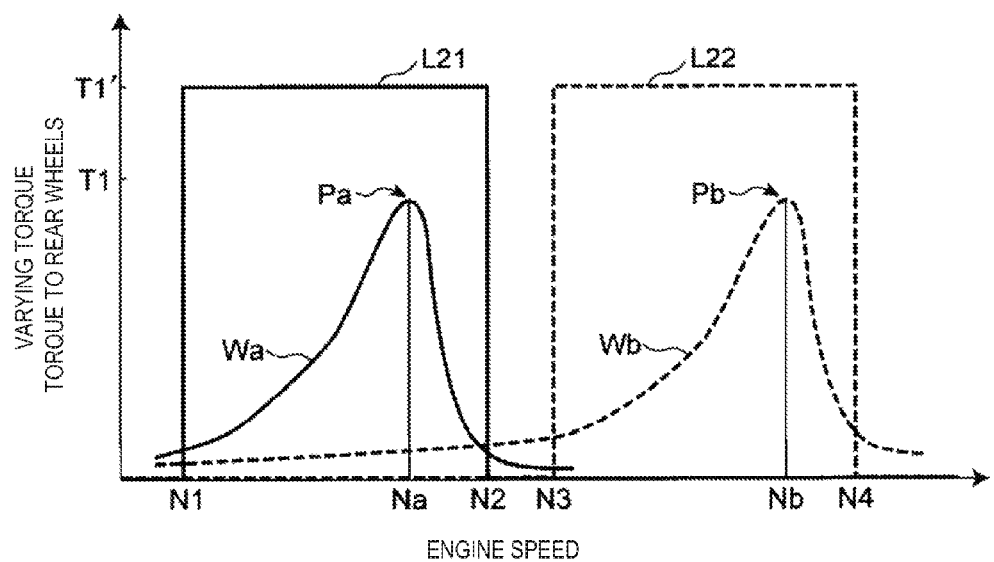

FIGS. 6A and 6B are charts illustrating relationships of an engine speed with a varying torque of a drivetrain and a torque applied to the rear wheels, in a four-wheel drive vehicle according to a fourth embodiment of the present invention, in which FIG. 6A illustrates the torque to the rear wheels in the all-cylinder and reduced-cylinder operating modes, respectively, and FIG. 6B illustrates the torque applied to the rear wheels in changing the operating mode.

The four-wheel drive vehicle of the fourth embodiment is substantially the same as the four-wheel drive vehicle 10 of the first embodiment except that in changing the operating mode, the torque applied to the rear wheels is temporarily changed based on a corresponding operating mode changing torque map and then changed to the torque applied in the operating mode after the change is completed. Therefore, description of the similar configurations between the first and fourth embodiments is omitted.

Also in this embodiment, as illustrated in FIG. 6A, in the all-cylinder operating mode, the controller 34 performs the noise suppressing control for the all-cylinder operating mode within the first engine operating range (i.e., the operating range between the first and second engine speeds N1 and N2). Specifically, to suppress noise generation, the controller 34 increases the torque applied to the rear wheels 12R to the torque T1, indicated by the solid line L1 in FIG. 6A, which exceeds the varying torque at the peak Pa of the waveform Wa.

Further, in the reduced-cylinder operating mode, the controller 34 performs the noise suppressing control for the reduced-cylinder operating mode within the second engine operating range (i.e., the operating range between the third and fourth engine speeds N3 and N4). Specifically, to suppress noise generation, the controller 34 increases the torque applied to the rear wheels 12R to the torque T1, indicated by the dashed line L2 in FIG. 6A, which exceeds the varying torque at the peak Pb of the waveform Wb.

The controller 34 changes the torque applied to the rear wheels 12R according to the operating ranges where the torque transmission assembly (i.e., the drivetrain) is in the noise generating state in the all-cylinder and reduced-cylinder operating modes, respectively.

In this embodiment, in a change from the all-cylinder operating mode to the reduced-cylinder operating mode and in a change from the reduced-cylinder operating mode to the all-cylinder operating mode, the controller 34 temporarily changes the torque applied to the rear wheels 12R based on the respective operating mode changing torque maps in which a relationship between the engine speed and the torque applied to the rear wheels 12R is preset, and then the controller 34 changes the torque applied to the rear wheels 12R to that applied in the operating mode after the change is completed.

The controller 34 stores an operating mode changing torque map in which the relationship between the engine speed and the torque applied to the rear wheels 12R during the change from the all-cylinder operating mode to the reduced-cylinder operating mode is preset, and stores an operating mode changing torque map in which the relationship between the engine speed and the torque applied to the rear wheels 12R during the change from the reduced-cylinder operating mode to the all-cylinder operating mode is preset.

The operating mode changing torque map for the change from the reduced-cylinder operating mode to the all-cylinder operating mode is preset so that the torque applied to the rear wheels 12R is changed to a torque T1', indicated by the solid line L21 in FIG. 6B, which is greater than the torque T1 supplied after the change is completed, within an operating range where the torque applied to the rear wheels 12R is increased during the change (from the reduced-cylinder operating mode to the all-cylinder operating mode), in other words, the operating range between the first and second engine speeds N1 and N2.

On the other hand, the operating mode changing torque map for the change from the all-cylinder operating mode to the reduced-cylinder operating mode is preset so that the torque applied to the rear wheels 12R is changed to the torque T1', indicated by the dashed line L22 in FIG. 6B, which is greater than the torque T1 supplied after the change is completed, within an operating range where the torque applied to the rear wheels 12R is increased during the change (from the all-cylinder operating mode to the reduced-cylinder operating mode), in other words, the operating range between the third and fourth engine speeds N3 and N4.

During the change from the reduced-cylinder operating mode to the all-cylinder operating mode, based on the operating mode changing torque map for the change from the reduced-cylinder operating mode to the all-cylinder operating mode, within the operating range between the first and second engine speeds N1 and N2, the controller 34 temporarily increases the torque applied to the rear wheels 12R to the torque T1' which is greater than the torque T1 supplied after the change is completed, and then the controller 34 changes the torque applied to the rear wheels 12R to the torque T1.

Figure 7A:
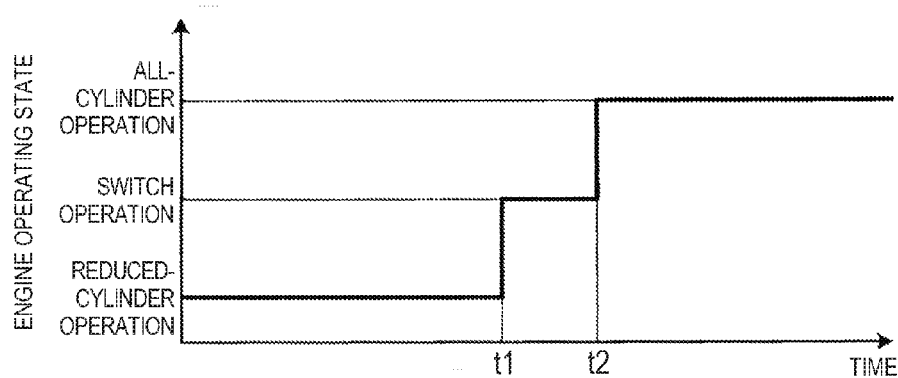
FIGS. 7A to 7C are views illustrating a control of a torque increase to the rear wheels during a change of an operating mode of the engine.
Figure 7B:
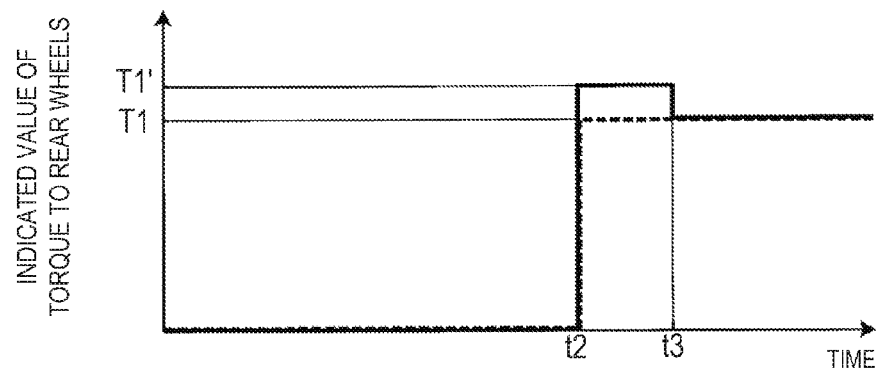
Figure 7C:
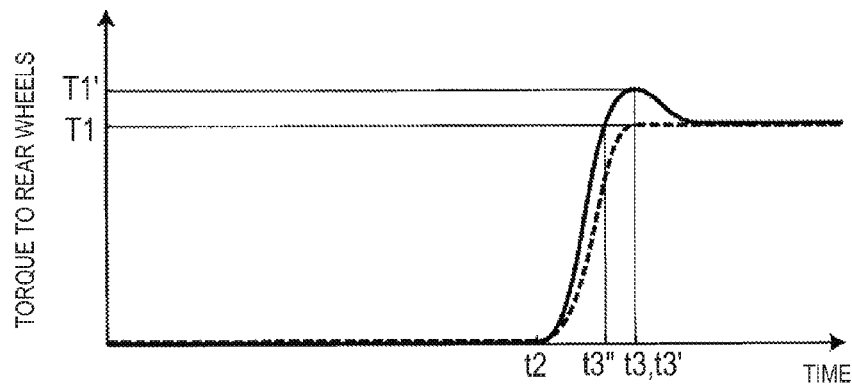

FIGS. 7A to 7C are views illustrating a control of the torque increase to the rear wheels during the change of the operating mode. As illustrated in FIG. 7A, at a time point t1, when changing from the reduced-cylinder operating mode to the all-cylinder operating mode, a switch control from the reduced-cylinder operating mode to the all-cylinder operating mode is started. During the switch control, at the time point t1, the engine is controlled to be in a switch operation state to change from the reduced-cylinder operating state to the all-cylinder operating state, and at a time point t2 which is after a predetermined period of time from the time point t1, the engine is controlled to be in the all-cylinder operating state.

As indicated by the dashed lines in FIGS. 7B and 7C, in a case where the control of the torque increase to the rear wheels 12R is started so as to reach the torque T1 (i.e., in a case where an instructed value of the torque applied to the rear wheels 12R is set to T1) within the operating range between the first and second engine speeds N1 and N2 when the engine is configured to be in the all-cylinder operating state at the time point t2, an actual torque applied to the rear wheels 12R is gradually increased and the torque T1 is actually applied to the rear wheels 12R at a time point t3 that is after a predetermined period of time from the time point t2. Thus, a response lag occurs in the control of the torque increase to the rear wheels 12R, which may cause noise at the torque transmission assembly.

An actual rate of the torque increase to the rear wheels 12R in response to the control of the torque increase to the rear wheels 12R becomes higher as a change of the instructed value of the torque applied to the rear wheels 12R (hereinafter, may be referred to as "the rear-wheel torque instructed value") becomes larger. Therefore in this embodiment, when changing from the reduced-cylinder operating mode to the all-cylinder operating mode, the torque applied to the rear wheels 12R is temporarily increased to the torque T1' which is greater than the torque T1 supplied after the change is completed, based on the operating mode changing torque map for the change from the reduced-cylinder operating mode to the all-cylinder operating mode.

As indicated by the solid lines in FIGS. 7A to 7C, when the engine is controlled to be in the all-cylinder operating state at the time point t2, within the operating range between the first and second engine speeds N1 and N2, the control of the torque increase to the rear wheels 12R is started so as to reach the torque T1', and then when the torque T1' is actually applied to the rear wheels 12R at a time point t3', the rear-wheel torque instructed value is changed to the torque T1 so that the torque T1 is applied to the rear wheels 12R.

Thus, the rear-wheel torque instructed value can be swiftly increased to swiftly increase the actual torque applied to the rear wheels 12R, and the torque applied to the rear wheels 12R can be increased to the torque T1 or greater at a time point t3'' that is before the time point t3. As a result, noise generation due to the response lag in the control of the torque increase to the rear wheels 12R can be suppressed.

Similarly during the change from the all-cylinder operating mode to the reduced-cylinder operating mode, based on the operating mode changing torque map for the change from the all-cylinder operating mode to the reduced-cylinder operating mode, within the operating range between the third and fourth engine speeds N3 and N4, the controller 34 temporarily increases the torque applied to the rear wheels 12R to the torque T1' which is greater than the torque T1 supplied after the change is completed, and then the controller 34 changes the torque applied to the rear wheels 12R to the torque T1.

In this embodiment, during the change from the all-cylinder operating mode to the reduced-cylinder operating mode and during the change from the reduced-cylinder operating mode to the all-cylinder operating mode, the torque applied to the rear wheels 12R is temporarily increased to the same torque T1'. However, it will be appreciated that the torque applied to the rear wheels 12R may temporarily be increased to different torques during the change from the all-cylinder operating mode to the reduced-cylinder operating mode and during the change from the reduced-cylinder operating mode to the all-cylinder operating mode.

Thus, the four-wheel drive vehicle of this embodiment also includes the controller 34 that executes the noise suppression module for increasing the torque applied to the rear wheels 12R in the all-cylinder and reduced-cylinder operating modes to suppress noise generation at the torque transmission assembly. The controller 34 that executes the noise suppression module changes the torque applied to the rear wheels 12R according to the operating ranges where the torque transmission assembly is in the noise generating state in the all-cylinder and reduced-cylinder operating modes, respectively. As a result, noise generation in the all-cylinder and reduced-cylinder operating modes can be suppressed while suppressing the degradation of fuel economy.

Further, in changing the operating mode, within the operating range where the torque applied to the rear wheels 12R is increased during the change, the controller 34 that executes the noise suppression module temporarily increases the rear-wheel torque instructed value to be higher than the torque supplied after the change is completed (hereinafter, may be referred to as "the target torque"). Thus, the torque applied to the rear wheels 12R can be swiftly increased to the target torque, and noise generation due to the response lag in the control of the torque increase to the rear wheels 12R can be suppressed.

In this embodiment, in changing the operating mode, when the engine is controlled to be in the operating state corresponding to the operating mode after the change is completed, the torque applied to the rear wheels 12R is temporarily increased to be higher than the target torque so as to suppress noise generation due to the response lag in the control of the torque increase to the rear wheels 12R. However, in changing the operating mode, the torque applied to the rear wheels 12R may be increased to the target torque when the engine is controlled to be in the switch operation state, so as to suppress noise generation due to the response lag in the control of the torque increase to the rear wheels 12R.

Figure 8A:
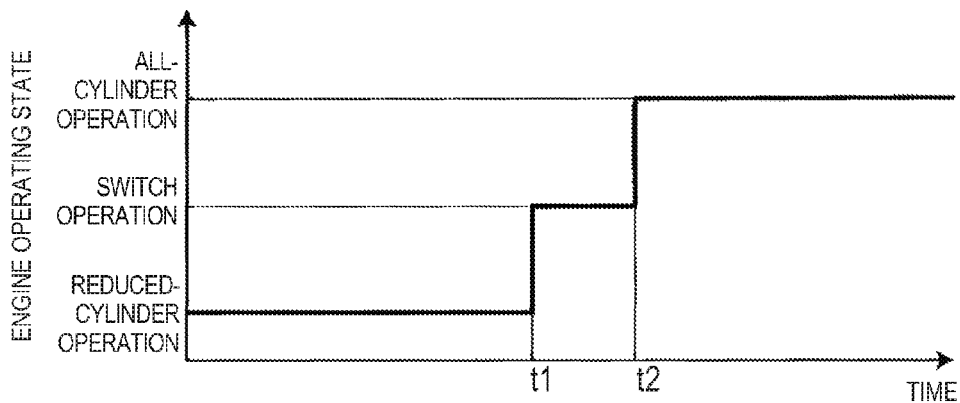
FIGS. 8A to 8C are views illustrating another control of a torque increase to the rear wheels during the change of the operating mode.
Figure 8B:
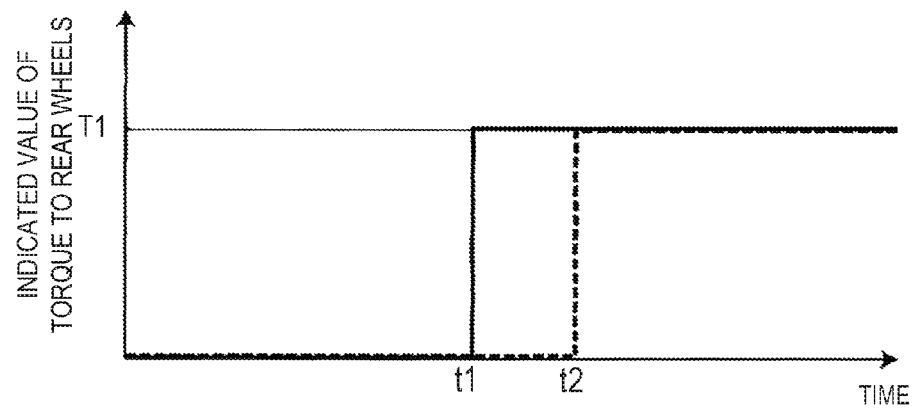
Figure 8C:
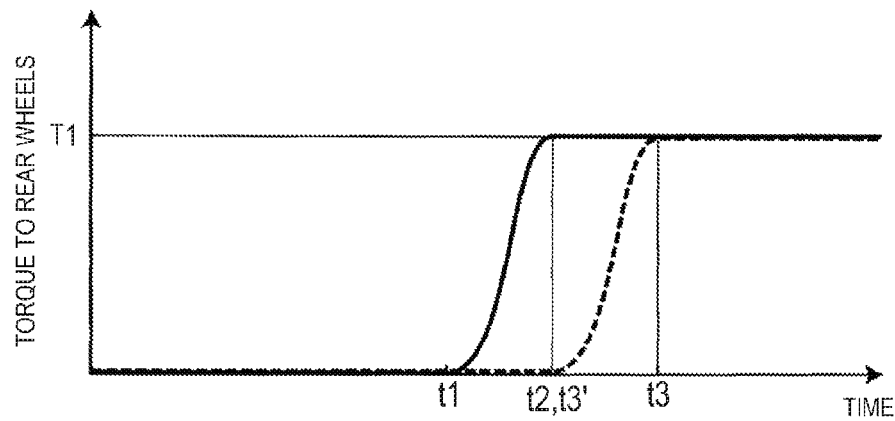

FIGS. 8A to 8C are views illustrating another control of the torque increase to the rear wheels during the change of the operating mode. Note that FIGS. 8B and 8C and FIGS. 9B and 9C described later also illustrate the rear-wheel torque instructed value and the torque applied to the rear wheels 12R indicated by the dashed lines in FIGS. 7B and 7C.

As indicated by the solid lines in FIGS. 8A to 8C, at the time point t1, when the engine is controlled to be in the switch operation state for changing from the reduced-cylinder operating state to the all-cylinder operating state, within the operating range between the first and second engine speeds N1 and N2, the control of the torque increase to the rear wheels 12R is started so as to reach the torque T1. Thus, the torque T1 can be applied to the rear wheels 12R at a time point t3' which is before the time point t3 at which the torque T1 is applied to the rear wheels 12R in the case where the control of the torque increase to the rear wheels 12R is started when the engine is controlled to be in the all-cylinder operating state, and noise generation due to the response lag in the control of the torque increase to the rear wheels 12R can be suppressed.

Similarly, when the engine is controlled to be in the switch operation state for changing from the all-cylinder operating state to the reduced-cylinder operating state, within the operating range between the third and fourth engine speeds N3 and N4, the control of the torque increase to the rear wheels 12R is started so as to reach the torque T1. Thus, noise generation due to the response lag in the control of the torque increase to the rear wheels 12R can be suppressed.

Further, when the engine is controlled to be in the switch operation state during the change of the operating mode, the torque applied to the rear wheels 12R may temporarily be increased to be higher than the target torque, so as to even further suppress noise generation due to the response lag in the control of the torque increase to the rear wheels 12R.

Figure 9A:
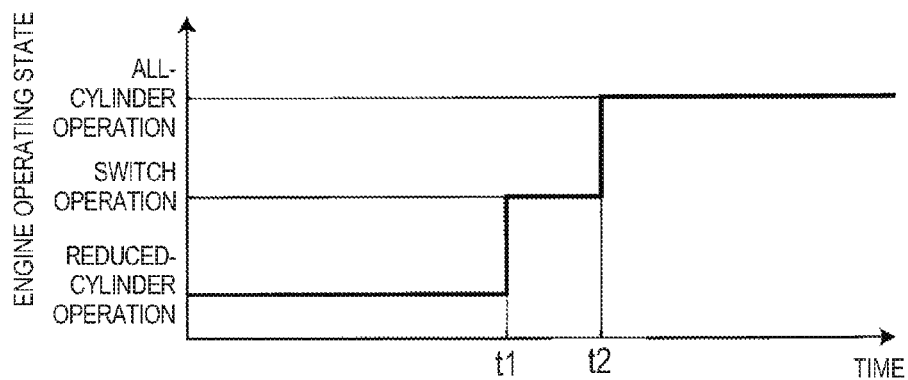
FIGS. 9A to 9C are views illustrating yet another control of a torque increase to the rear wheels during the change of the operating mode.
Figure 9B:
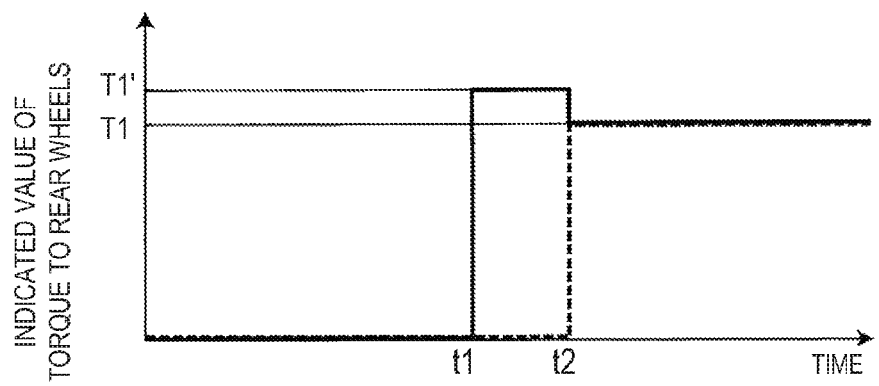
Figure 9C:
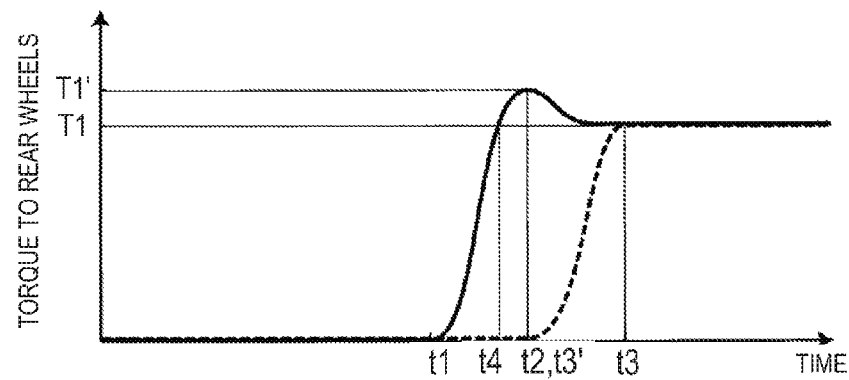

FIGS. 9A to 9C are views illustrating yet another control of the torque increase to the rear wheels during the change of the operating mode. As indicated by the solid lines in FIGS. 9A to 9C, at the time point t1, when the engine is controlled to be in the switch operation state for changing from the reduced-cylinder operating mode to the all-cylinder operating mode, within the operating range between the first and second engine speeds N1 and N2, the control of the torque increase to the rear wheels 12R is started so as to reach the torque T1' which is greater than the torque T1 (target torque), then when the torque T1' is applied to the rear wheels 12R at the time point t2 or t3', the rear-wheel torque instructed value is changed to T1 so that the torque T1 is applied to the rear wheels 12R. Thus, the torque applied to the rear wheels 12R can be increased to the torque T1 or greater at a time point t4 which is before the time point t3 at which the torque T1 is applied to the rear wheels 12R in the case where the control of the torque increase to the rear wheels 12R is started when the engine is controlled to be in the all-cylinder operating state, and noise generation due to the response lag in the control of the torque increase to the rear wheels 12R can be suppressed even more.

Similarly, when the engine is controlled to be in the switch operation state for changing from the all-cylinder operating state to the reduced-cylinder operating state, within the operating range between the third and fourth engine speeds N3 and N4, the control of the torque increase to the rear wheels 12R is started so as to reach the torque T1', then when the torque T1' is applied to the rear wheels 12R, the rear-wheel torque instructed value is changed to T1 so that the torque T1 is applied to the rear wheels 12R. Thus, noise generation due to the response lag in the control of the torque increase to the rear wheels 12R can be suppressed even more.

Figure 10A:
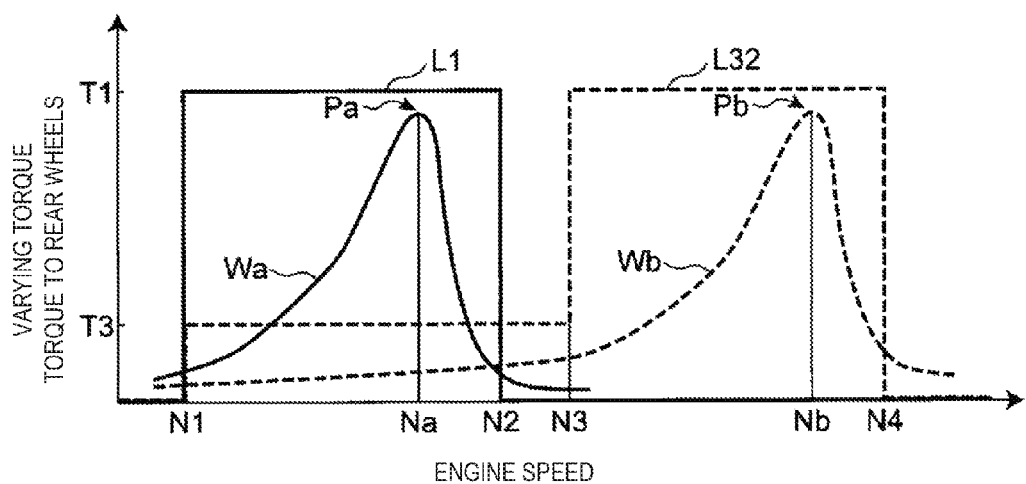
FIGS. 10A and 10B are charts illustrating relationships between an engine speed and a varying torque of a drivetrain or a torque applied to the rear wheels, in a four-wheel drive vehicle according to a fifth embodiment of the present invention.
Figure 10B:
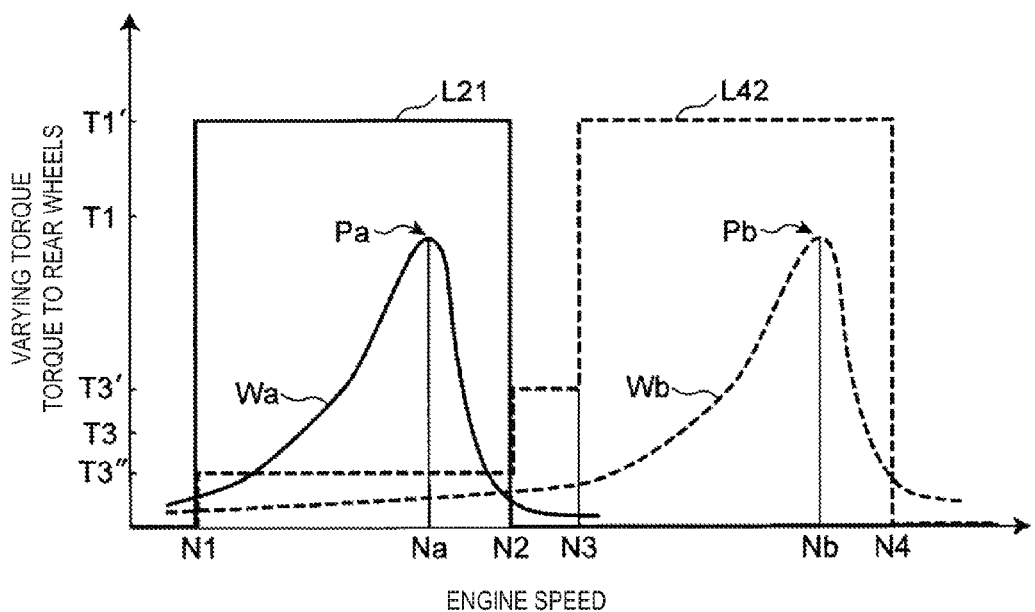

FIGS. 10A and 10B are charts illustrating relationships of an engine speed with a varying torque of a drivetrain and a torque applied to the rear wheels, in a four-wheel drive vehicle according to a fifth embodiment of the present invention. FIG. 10A illustrates the torque applied to the rear wheels in the all-cylinder and reduced-cylinder operating modes, and FIG. 10B illustrates the torque applied to the rear wheels in changing the operating mode.

The four-wheel drive vehicle of the fifth embodiment is substantially the same as the four-wheel drive vehicle of the fourth embodiment except that the relationship between the engine speed and the torque applied to the rear wheels 12R for the noise suppressing control in the reduced-cylinder operating mode is different and the operating mode changing torque map for the change from the all-cylinder operating mode to the reduced-cylinder operating mode is different. Therefore, description of the similar configurations between the fourth and fifth embodiments is omitted.

Also in this embodiment, as illustrated in FIG. 10A, in the all-cylinder operating mode, the controller 34 performs the noise suppressing control for the all-cylinder operating mode within the first engine operating range (i.e., the operating range between first and second engine speeds N1 and N2). Specifically, to suppress noise generation, the controller 34 increases the torque applied to the rear wheels 12R to the torque T1, indicated by the solid line L1 in FIG. 10A, which exceeds the varying torque at the peak Pa of the waveform Wa.

In this embodiment, in the controller 34, an operating range that includes the engine speed Nb corresponding to the peak Pb of the waveform Wb of the varying torque and is between the first engine speed N1 and the fourth engine speed N4 that is higher than the first engine speed is preset and stored as a second engine operating range where the torque transmission assembly is in the noise generating state in the reduced-cylinder operating mode.

Further, in the reduced-cylinder operating mode, the controller 34 performs the noise suppressing control for the reduced-cylinder operating mode, within the second engine operating range, in other words, the operating range between first and fourth engine speeds N1 and N4. Specifically, to suppress noise generation, as indicated by the dashed line L32 in FIG. 10A, within the operating range between the first and third engine speeds N1 and N3, the controller 34 increases the torque applied to the rear wheels 12R to a torque T3 which exceeds the varying torque of the waveform Wb, and within the operating range between the third and fourth engine speeds N3 and N4, the controller 34 increases the torque applied to the rear wheels 12R to the torque T1 which exceeds the peak Pb of the waveform Wb and is greater than the torque T3.

Also in this embodiment, during the change from the all-cylinder operating mode to the reduced-cylinder operating mode and during the change from the reduced-cylinder operating mode to the all-cylinder operating mode, the controller 34 temporarily changes the torque applied to the rear wheels 12R based on respective operating mode changing torque maps in which the relationship between the engine speed and the torque applied to the rear wheels 12R is preset, and then the controller 34 changes the torque applied to the rear wheels 12R to that applied in the operating mode after the change is completed.

The controller 34 stores an operating mode changing torque map in which the relationship between the engine speed and the torque applied to the rear wheels 12R during the change from the all-cylinder operating mode to the reduced-cylinder operating mode is preset, and stores an operating mode changing torque map in which the relationship between the engine speed and the torque applied to the rear wheels 12R during the change from the reduced-cylinder operating mode to the all-cylinder operating mode is preset.

The operating mode changing torque map for the change from the reduced-cylinder operating mode to the all-cylinder operating mode is preset as indicated by the solid line L21 in FIG. 10B so that the torque applied to the rear wheels 12R is changed to a torque T1' which is greater than the torque T1 supplied after the change (target torque) is completed within an operating range where the torque applied to the rear wheels 12R is increased during the change (i.e., from the reduced-cylinder operating mode to the all-cylinder operating mode), in other words, the operating range between the first and second engine speeds N1 and N2.

On the other hand, the operating mode changing torque map for the change from the all-cylinder operating mode to the reduced-cylinder operating mode is preset as indicated by the dashed line L42 in FIG. 10B so that the torque applied to the rear wheels 12R is changed to the torque which is greater than the target torque within the operating range where the torque applied to the rear wheels 12R is increased during the change (i.e., from the all-cylinder operating mode to the reduced-cylinder operating mode), in other words, the operating range between the second and fourth engine speeds N2 and N4.

Specifically, the operating mode changing torque map for the change from the all-cylinder operating mode to the reduced-cylinder operating mode is preset so that within the operating range between the second and third engine speeds N2 and N3, the torque applied to the rear wheels 12R is changed to a torque T3' which is greater than the torque T3 supplied after the change is completed, and within the operating range between the third and fourth engine speeds N3 and N4, the torque applied to the rear wheels 12R is changed to the torque T1' which is greater than the torque T1 supplied after the change is completed.

The operating mode changing torque map for the change from the all-cylinder operating mode to the reduced-cylinder operating mode is further preset so that within the operating range where the torque applied to the rear wheels 12R is reduced during the change (i.e., from the all-cylinder operating mode to the reduced-cylinder operating mode), in other words, the operating range between the first and second engine speeds N1 and N2, the torque applied to the rear wheels 12R is changed to a torque T3" which is below the torque T3 supplied after the change is completed.

During the change from the reduced-cylinder operating mode to the all-cylinder operating mode, based on the operating mode changing torque map for the change from the reduced-cylinder operating mode to the all-cylinder operating mode, within the operating range between the first and second engine speeds N1 and N2, the controller 34 temporarily increases the torque applied to the rear wheels 12R to be the torque T1' which is greater than the torque T1 supplied after the change is completed, and then the controller 34 changes the torque applied to the rear wheels 12R to the torque T1.

Likewise, during the change from the all-cylinder operating mode to the reduced-cylinder operating mode, based on the operating mode changing torque map for the change from the all-cylinder operating mode to the reduced-cylinder operating mode, within the operating range between the second and third engine speeds N2 and N3, the controller 34 temporarily increases the torque applied to the rear wheels 12R to the torque T3' which is greater than the torque T3 supplied after the change is completed, and then the controller 34 changes the torque applied to the rear wheels 12R to the torque T3.

Further, based on the operating mode changing torque map for the change from the all-cylinder operating mode to the reduced-cylinder operating mode, within the operating range between the third and fourth engine speeds N3 and N4, the torque applied to the rear wheels 12R is temporarily increased to the torque T1' which is greater than the torque T1 supplied after the change is completed, and then the torque applied to the rear wheels 12R is changed to the torque T1.

Furthermore, during the change from the all-cylinder operating mode to the reduced-cylinder operating mode, based on the operating mode changing torque map for the change from the all-cylinder operating mode to the reduced-cylinder operating mode, within the operating range between the first and second engine speeds N1 and N2, the torque applied to the rear wheels 12R is temporarily reduced to the torque T3" which is below the torque T3 supplied after the change is completed, and then the controller 34 changes the torque applied to the rear wheels 12R to the torque T3.

Figure 11A:
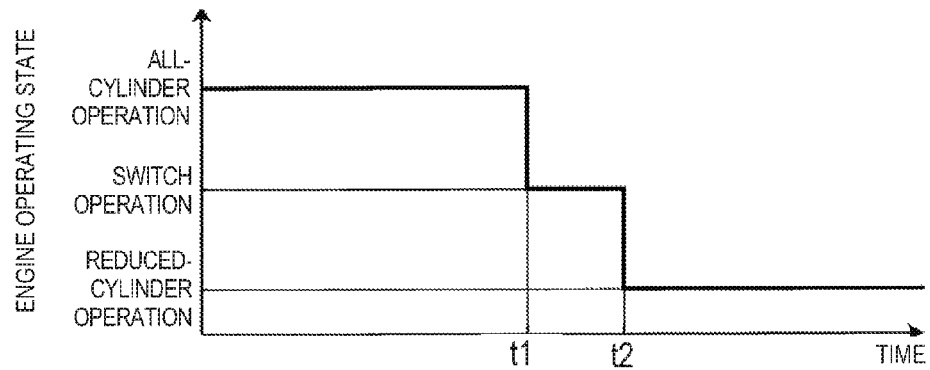
FIGS. 11A to 11C are views illustrating a control of a torque reduction to the rear wheels during a change of an operating mode of the engine.
Figure 11B:
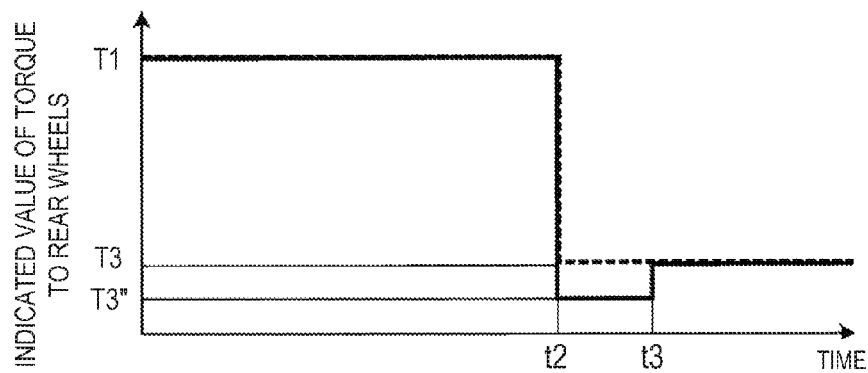
Figure 11C:
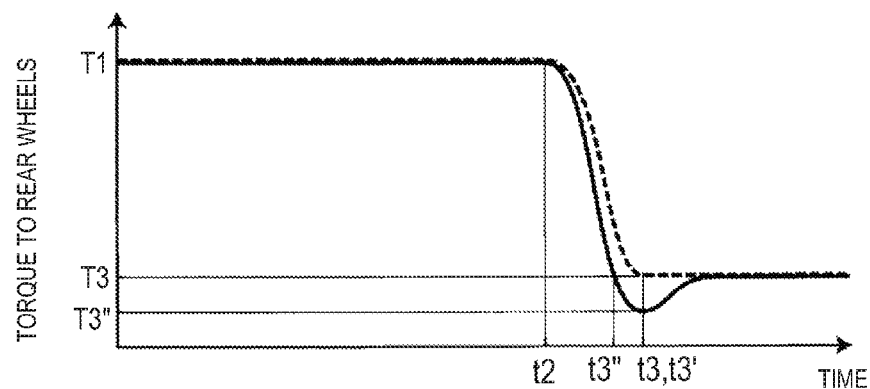

FIGS. 11A to 11C are views illustrating a control of the torque reduction to the rear wheels during the change of the operating mode. As illustrated in FIGS. 11A to 11C, at a time point t1, when changing from the all-cylinder operating mode to the reduced-cylinder operating mode, a switch control from the all-cylinder operating mode to the reduced-cylinder operating mode is started. During the switch control, at the time point t1, the engine is controlled to be in a switch operation state to change from the all-cylinder operating state to the reduced-cylinder operating state, and at a time point t2 which is after a predetermined period of time from the time point t1, the engine is controlled to be in the reduced-cylinder operating state.

As indicated by the dashed lines in FIGS. 11B and 11C, in a case where the control of the torque reduction to the rear wheels 12R is started so as to reach the torque T3 (i.e., in a case where the rear-wheel torque instructed value is set to T3) within the operating range between the first and second engine speeds N1 and N2 when the engine is controlled to be in the reduced-cylinder operating state at the time point t2, an actual torque applied to the rear wheels 12R is gradually reduced and the torque T3 is actually applied to the rear wheels 12R at a time point t3 after a predetermined period of time from the time point t2. Thus, a response lag occurs in the control of the torque reduction to the rear wheels 12R, which may cause the degradation of fuel economy.

An actual rate of the torque reduction to the rear wheels 12R in response to the control of the torque reduction to the rear wheels 12R becomes higher as a change in the rear-wheel instructed value becomes larger. Therefore in this embodiment, when changing from the all-cylinder operating mode to the reduced-cylinder operating mode, the torque applied to the rear wheels 12R is temporarily reduced to the torque T3" which is below the torque T3 supplied after the change is completed, based on the operating mode changing torque map for the change from the all-cylinder operating mode to the reduced-cylinder operating mode.

As indicated by the solid lines in FIGS. 11A to 11C, when the engine is controlled to be in the reduced-cylinder operating state at the time point t2, within the operating range between the first and second engine speeds N1 and N2, the control of the torque reduction to the rear wheels 12R is started so as to reach the torque T3", and then when the torque T3" is applied to the rear wheels 12R at a time point t3', the rear-wheel torque instructed value is changed to the torque T3 so that the torque T3 is applied to the rear wheels 12R.

Thus, the rear-wheel torque instructed value can be swiftly reduced to swiftly reduce the actual torque applied to the rear wheels 12R, and the torque applied to the rear wheels 12R can be reduced to the torque T3 or below at a time point t3" that is before the time point t3. As a result, the degradation of fuel economy due to the response lag in the control of the torque reduction to the rear wheels 12R can be suppressed.

As described above, the four-wheel drive vehicle of this embodiment also includes the controller 34 that executes the noise suppression module for increasing the torque applied to the rear wheels 12R in the all-cylinder and reduced-cylinder operating modes to suppress noise generation at the torque transmission assembly. The controller 34 that executes the noise suppression module changes the torque applied to the rear wheels 12R according to the operating ranges where the torque transmission assembly is in the noise generating state in the all-cylinder and reduced-cylinder operating modes, respectively. As a result, noise generation in the all-cylinder and reduced-cylinder operating modes can be suppressed while suppressing the degradation of fuel economy.

Further, in changing the operating mode, within the operating range where the torque applied to the rear wheels 12R is increased during the change, the controller 34 that executes the noise suppression module temporarily increases the rear-wheel torque instructed value to be higher than the target torque. Thus, the actual torque applied to the rear wheels 12R can be swiftly increased to the target torque, and noise generation due to the response lag in the control of the torque increase to the rear wheels 12R can be suppressed.

Moreover, in changing the operating mode, within the operating range where the torque applied to the rear wheels 12R is reduced during the change, the controller 34 that executes the noise suppression module temporarily reduces the rear-wheel torque instructed value to be lower than the target torque. Thus, the actual torque applied to the rear wheels 12R can be swiftly reduced to the target torque, and the degradation of fuel economy can be suppressed even more.

In this embodiment, during the change from the all-cylinder operating mode to the reduced-cylinder operating mode, when the engine is controlled to be in the reduced-cylinder operating state, the torque applied to the rear wheels 12R is temporarily reduced during the change, so as to suppress the degradation of fuel economy due to the response lag in the control of the torque reduction to the rear wheels 12R. However, during the change from the all-cylinder operating mode to the reduced-cylinder operating mode, the torque applied to the rear wheels 12R may be reduced to the target torque when the engine is controlled to be in the switch operation state, so as to suppress the degradation of fuel economy due to the response lag in the control of the torque reduction to the rear wheels 12R.

Figure 12A:
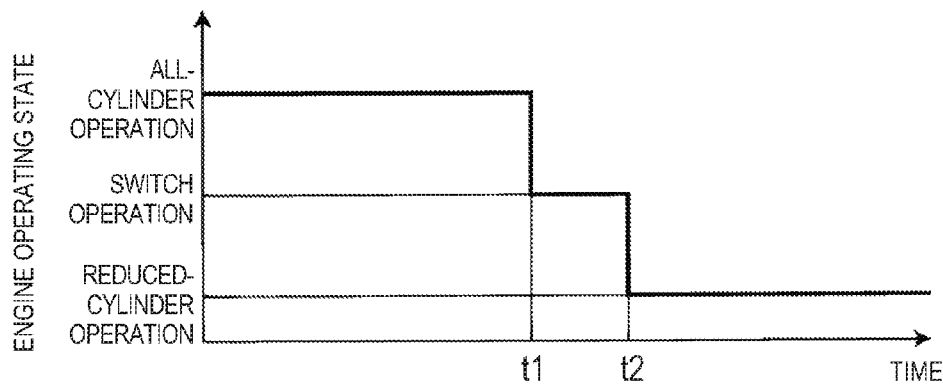
FIGS. 12A to 12C are views illustrating another control of the torque reduction to the rear wheels during the change of the operating mode.
Figure 12B:
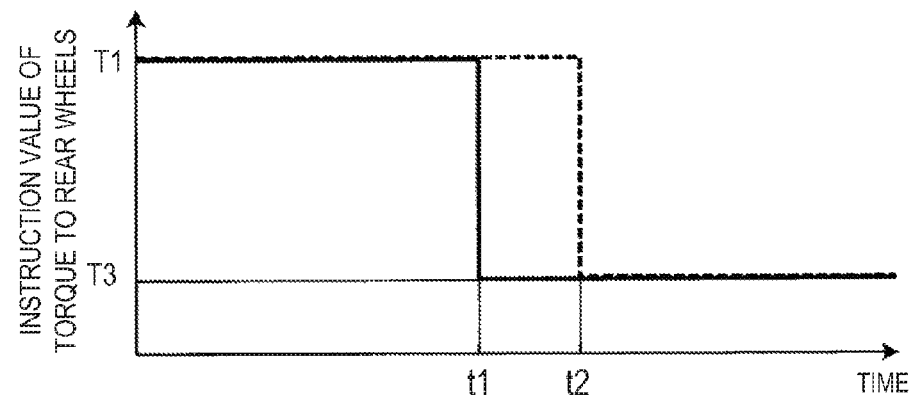
Figure 12C:
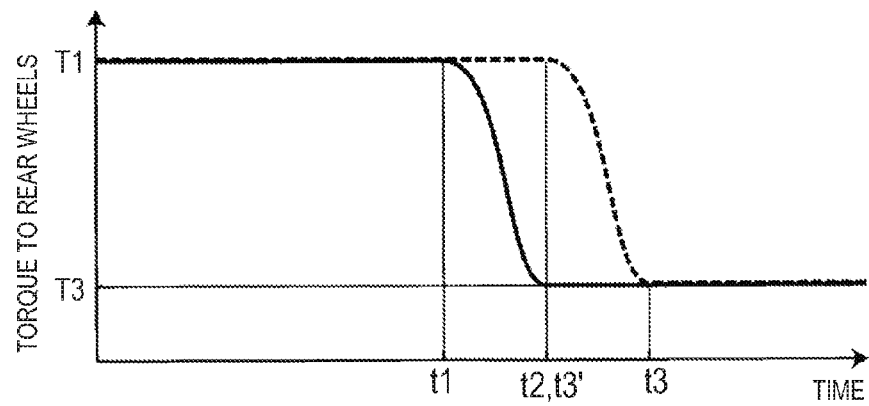

FIGS. 12A to 12C are views illustrating another control of the torque reduction to the rear wheels during the change of the operating mode. Note that FIGS. 12B and 12C and FIGS. 13B and 13C described later also illustrate the rear-wheel torque instructed value and the torque applied to the rear wheels 12R indicated by the dashed lines in FIGS. 11B and 11C.

As indicated by the solid lines in FIGS. 12A to 12C, at the time point t1, when the engine is controlled to be in the switch operation state for changing from the all-cylinder operating state to the reduced-cylinder operating state, within the operating range between the first and second engine speeds N1 and N2, the control of the torque reduction to the rear wheels 12R is started so as to reach the torque T3 (i.e., the rear-wheel torque instructed value is set to T3). Thus, the torque T3 can be applied to the rear wheels 12R at a time point t3' which is before the time point t3 at which the torque T3 is applied to the rear wheels 12R in the case where the control of the torque reduction to the rear wheels 12R is started when the engine is controlled to be in the reduced-cylinder operating state, and the degradation of fuel economy due to the response lag in the control of the torque reduction to the rear wheels 12R can be suppressed.

During the change from the all-cylinder operating mode to the reduced-cylinder operating mode, when the engine is controlled to be in the switch operation state, the torque applied to the rear wheels 12R may temporarily be reduced to be lower than the target torque, so as to even further suppress the degradation of fuel economy due to the response lag in the control of the torque reduction to the rear wheels 12R.

Figure 13A:
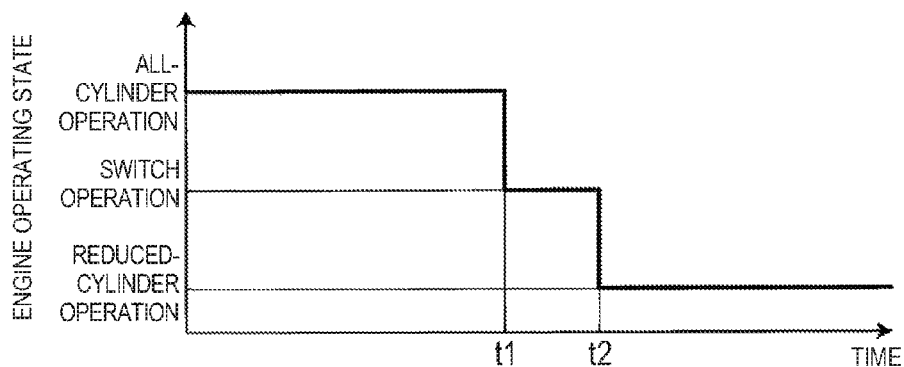
FIGS. 13A to 13C are views illustrating yet another control of the torque reduction to the rear wheels during the change of the operating mode.
Figure 13B:
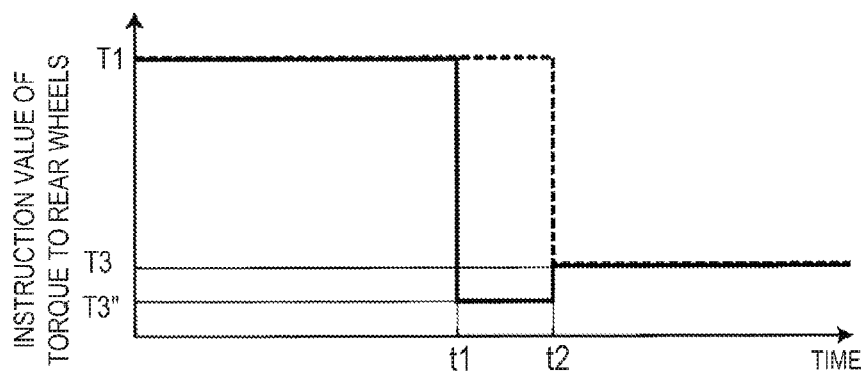
Figure 13C:
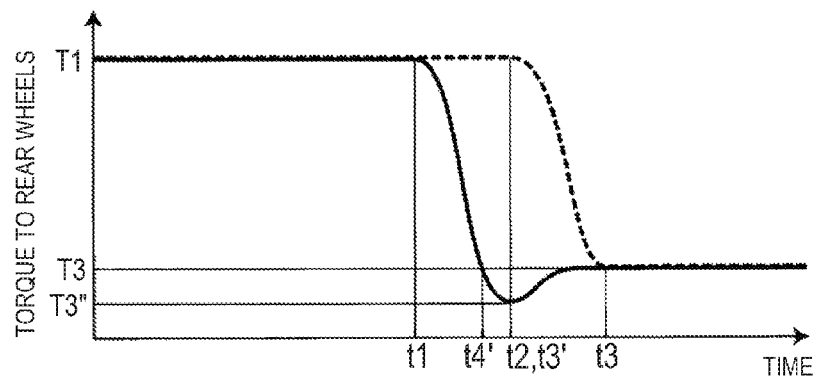

FIGS. 13A to 13C are views illustrating yet another control of the torque reduction to the rear wheels during the change of the operating mode. As indicated by the solid lines in FIGS. 13A to 13C, at the time point t1, when the engine is controlled to be in the switch operation state for changing from the all-cylinder operating state to the reduced-cylinder operating state, within the operating range between the first and second engine speeds N1 and N2, the control of the torque reduction to the rear wheels 12R is started so as to reach the torque T3" which is below the torque T3 supplied after the change is completed, then when the torque T3" is applied to the rear wheels 12R at the time point t3', the rear-wheel torque instructed value is changed to the torque T3 so that the torque T3 is applied to the rear wheels 12R. Thus, the torque applied to the rear wheels 12R can be reduced to the torque T3 or below at a time point t4' which is before the time point t3 at which the torque T3 is applied to the rear wheels 12R in the case where the control of the torque reduction to the rear wheels 12R is started when the engine is controlled to be in the reduced-cylinder operating state, and the degradation of fuel economy due to the response lag in the control of the torque reduction to the rear wheels 12R can be suppressed even more.

In the embodiments described above, the four-wheel drive vehicles 10 and 40 having the four-cylinder engine of which an operating mode is switchable between the all-cylinder operating mode, where the four cylinders are operated, and the reduced-cylinder operating mode, where two of the cylinders are operated, are described. However, the present invention is not limited to being applied to vehicles provided with a reduced-cylinder operating mode where two cylinders are operated, but may also similarly be applied to vehicles in which any of one to three cylinders are operated in the reduced-cylinder operating mode.

Figure 14:
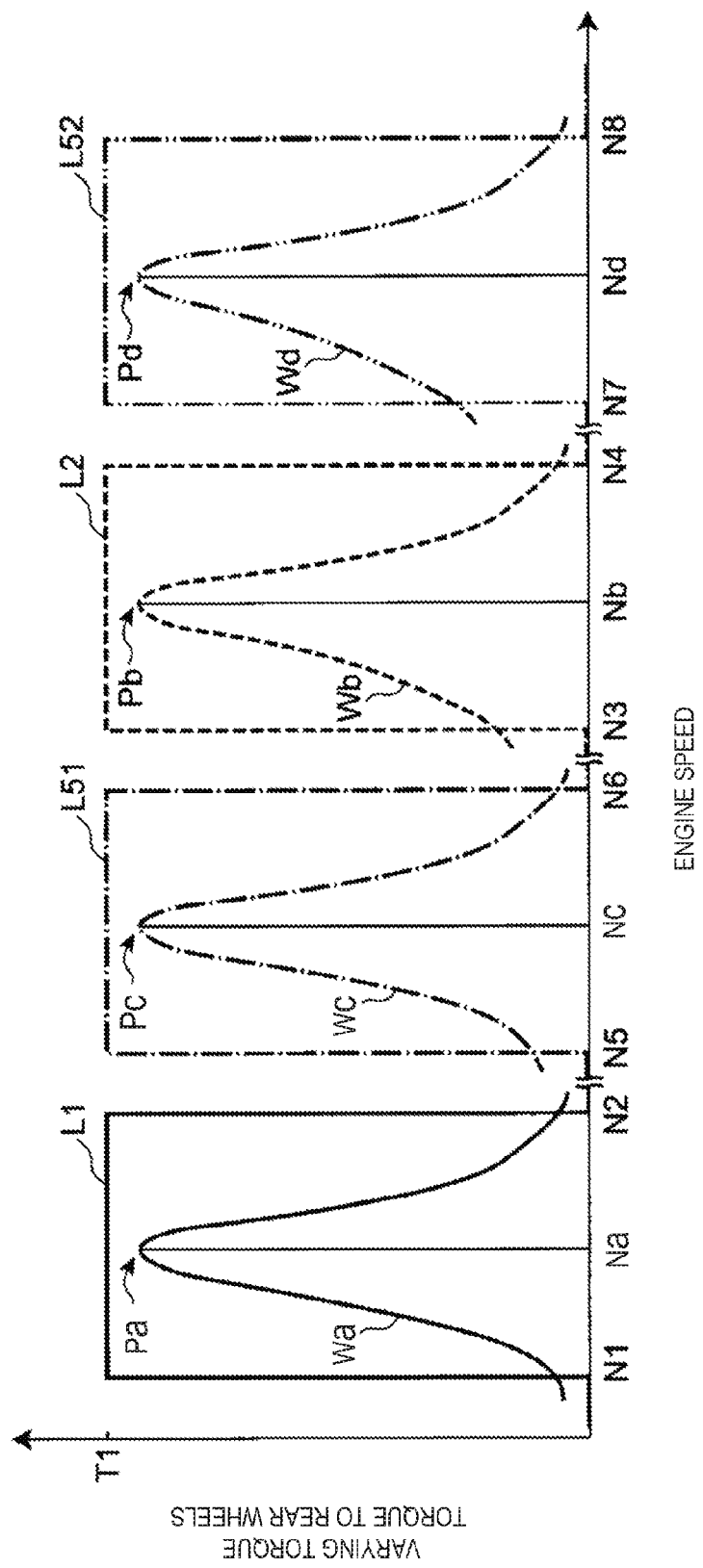
FIG. 14 is a chart illustrating a relationship between an engine speed and a varying torque of a drivetrain or a torque applied to the rear wheels, in a four-wheel drive vehicle according to a sixth embodiment of the present invention.

FIG. 14 is a chart illustrating a relationship of an engine speed with a varying torque of a drivetrain and a torque applied to the rear wheels, in a four-wheel drive vehicle according to a sixth embodiment of the present invention. The four-wheel drive vehicle of the sixth embodiment is substantially the same as the four-wheel drive vehicle 10 of the first embodiment except that reduced-cylinder operating modes where one of the cylinders and three of the cylinders are operated, respectively, are additionally provided and the torque applied to the rear wheels 12R is also increased in the reduced-cylinder operating modes to suppress noise generation at the torque transmission assembly. Therefore, description of the similar configurations between the first and sixth embodiments is omitted.

In this embodiment, the reduced-cylinder operating mode of the engine 14 is switchable among a one-cylinder-reduced operating mode where one of the cylinders is suspended and the other three cylinders are operated, a two-cylinder-reduced operating mode where two of the cylinders are suspended and the other two cylinders are operated, and a three-cylinder-reduced operating mode where three of the cylinders are suspended and the other one cylinder is operated. The engine 14 is switchable among an all-cylinder operating mode where the four cylinders are operated, and the three reduced-cylinder operating modes.

The controller 34 stores an operating mode map indicating a relationship between the engine speed and the accelerator opening with respect to the operating modes, specifically, to the all-cylinder operating mode, the one-cylinder-reduced operating mode, the two-cylinder-reduced operating mode, and the three-cylinder-reduced operating mode. The controller 34 switches the operating mode based on the engine speed and the accelerator opening by using the operating mode map.

Further, in the all-cylinder and the reduced-cylinder operating modes, the controller 34 increases the torque applied to the rear wheels 12R to suppress noise generation at the torque transmission assembly. In the all-cylinder operating mode, within the first engine operating range where the torque transmission assembly is in the noise generating state in the all-cylinder operating mode, the controller 34 increases the torque applied to the rear wheels 12R to suppress noise generation. In the two-cylinder-reduced operating mode, the one-cylinder-reduced operating mode, and the three-cylinder-reduced operating mode, within the second to fourth engine operating ranges where the torque transmission assembly is in the noise generating state in the reduced-cylinder operating modes, respectively, the controller 34 increases the torque applied to the rear wheels 12R to suppress noise generation.

In FIG. 14, a waveform of the varying torque of the drivetrain in the all-cylinder operating mode is indicated by the solid line Wa, a waveform of the varying torque of the drivetrain in the two-cylinder-reduced operating mode is indicated by the dashed line Wb, a waveform of the varying torque of the drivetrain in the one-cylinder-reduced operating mode is indicated by the one-dotted chain line Wc, and a waveform of the varying torque of the drivetrain in the three-cylinder-reduced operating mode is indicated by the two-dotted chain line Wd.

As illustrated in FIG. 14, the waveform Wa of the varying torque in the all-cylinder operating mode has a peak Pa at a predetermined engine speed Na, the waveform Wc of the varying torque in the one-cylinder-reduced operating mode has a peak Pc at a predetermined engine speed Nc that is higher than the engine speed Na, the waveform Wb of the varying torque in the two-cylinder-reduced operating mode has a peak Pb at a predetermined engine speed Nb that is higher than the engine speed Nc, and the waveform Wd of the varying torque in the three-cylinder-reduced operating mode has a peak Pd at a predetermined engine speed Nd that is higher than the engine speed Nb.

In the controller 34, an operating range that includes the engine speed Na corresponding to the peak Pa of the waveform Wa of the varying torque and is between a predetermined first engine speed N1 and a predetermined second engine speed N2 that is higher than the first engine speed N1 is preset and stored as a first engine operating range where the torque transmission assembly is in the noise generating state in the all-cylinder operating mode.

Further, in the controller 34, an operating range that includes the engine speed Nb corresponding to the peak Pb of the waveform Wb of the varying torque and is between a predetermined third engine speed N3 and a predetermined fourth engine speed N4 that is higher than the third engine speed N3 is preset and stored as a second engine operating range where the torque transmission assembly is in the noise generating state in the two-cylinder-reduced operating mode.

Further, in the controller 34, an operating range that includes the engine speed Nc corresponding to the peak Pc of the waveform Wc of the varying torque and is between a predetermined fifth engine speed N5 and a predetermined sixth engine speed N6 that is higher than the fifth engine speed N5 is preset and stored as a third engine operating range where the torque transmission assembly is in the noise generating state in the one-cylinder-reduced operating mode. Note that the fifth and sixth engine speeds N5 and N6 are set between the second and third engine speeds N2 and N3.

Further, in the controller 34, an operating range that includes the engine speed Nd corresponding to the peak Pd of the waveform Wd of the varying torque and is between a predetermined seventh engine speed N7 and a predetermined eighth engine speed N8 that is higher than the seventh engine speed N7 is preset and stored as a fourth engine operating range where the torque transmission assembly is in the noise generating state in the three-cylinder-reduced operating mode. Note that the seventh and eighth engine speeds N7 and N8 are set to be higher than the fourth engine speed N4.

In the all-cylinder operating mode, the controller 34 performs a noise suppressing control for the all-cylinder operating mode within the first engine operating range (i.e., the operating range between first and second engine speeds N1 and N2). Specifically, to suppress noise generation, the controller 34 increases the torque applied to the rear wheels 12R to a torque T1, indicated by the solid line L1 in FIG. 14, which exceeds the varying torque at the peak Pa of the waveform Wa.

Further, in the one-cylinder-reduced operating mode, the controller 34 performs a noise suppressing control for the one-cylinder-reduced operating mode within the third engine operating range (i.e., the operating range between fifth and sixth engine speeds N5 and N6). Specifically, to suppress noise generation, the controller 34 increases the torque applied to the rear wheels 12R to the torque T1, indicated by the one-dotted chain line L51 in FIG. 14, which exceeds the varying torque at the peak Pc of the waveform Wc.

Further, in the two-cylinder-reduced operating mode, the controller 34 performs a noise suppressing control for the two-cylinder-reduced operating mode within the second engine operating range (i.e., the operating range between third and fourth engine speeds N3 and N4). Specifically, to suppress noise generation, the controller 34 increases the torque applied to the rear wheels 12R to the torque T1, indicated by the dashed line L2 in FIG. 14, which exceeds the varying torque at the peak Pb of the waveform Wb.

Further, in the three-cylinder-reduced operating mode, the controller 34 performs a noise suppressing control for the three-cylinder-reduced operating mode within the fourth engine operating range (i.e., the operating range between seventh and eighth engine speeds N7 and N8). Specifically, to suppress noise generation, the controller 34 increases the torque applied to the rear wheels 12R to the torque T1, indicated by the two-dotted chain line L52 in FIG. 14, which exceeds the varying torque at the peak Pd of the waveform Wd.

In addition to the waveforms Wa, Wb, Wc, and Wd of the varying torque of the drivetrain of the four-wheel drive vehicle 10, it will be appreciated that relationships between the engine speed and the torque applied to the rear wheels 12R for the noise suppressing controls in the all-cylinder and reduced-cylinder operating modes, respectively, are also preset and stored in the controller 34.

Also in this embodiment, the controller 34 changes the torque applied to the rear wheels 12R according to the operating ranges where the torque transmission assembly is in the noise generating state in the all-cylinder and reduced-cylinder operating modes, respectively.

Thus, the four-wheel drive vehicle of this embodiment also includes the controller 34 that executes the noise suppression module for increasing the torque applied to the rear wheels 12R in the all-cylinder and reduced-cylinder operating modes to suppress noise generation at the torque transmission assembly. The controller 34 that executes the noise suppression module changes the torque applied to the rear wheels 12R according to the operating ranges where the torque transmission assembly is in the noise generating state in the all-cylinder and reduced-cylinder operating modes, respectively. As a result, noise generation in the all-cylinder and reduced-cylinder operating modes can be suppressed while suppressing the degradation of fuel economy.

Also in the four-wheel drive vehicle of the sixth embodiment, similar to the four-wheel drive vehicle of the fourth embodiment, during the change of the operating mode, within the operating range where the torque applied to the rear wheels 12R is increased during the change of the operating mode, the torque applied to the rear wheels 12R may temporarily be increased to be higher than the torque applied to the rear wheels 12R applied in the operating mode after the change is completed.

Figure 15:
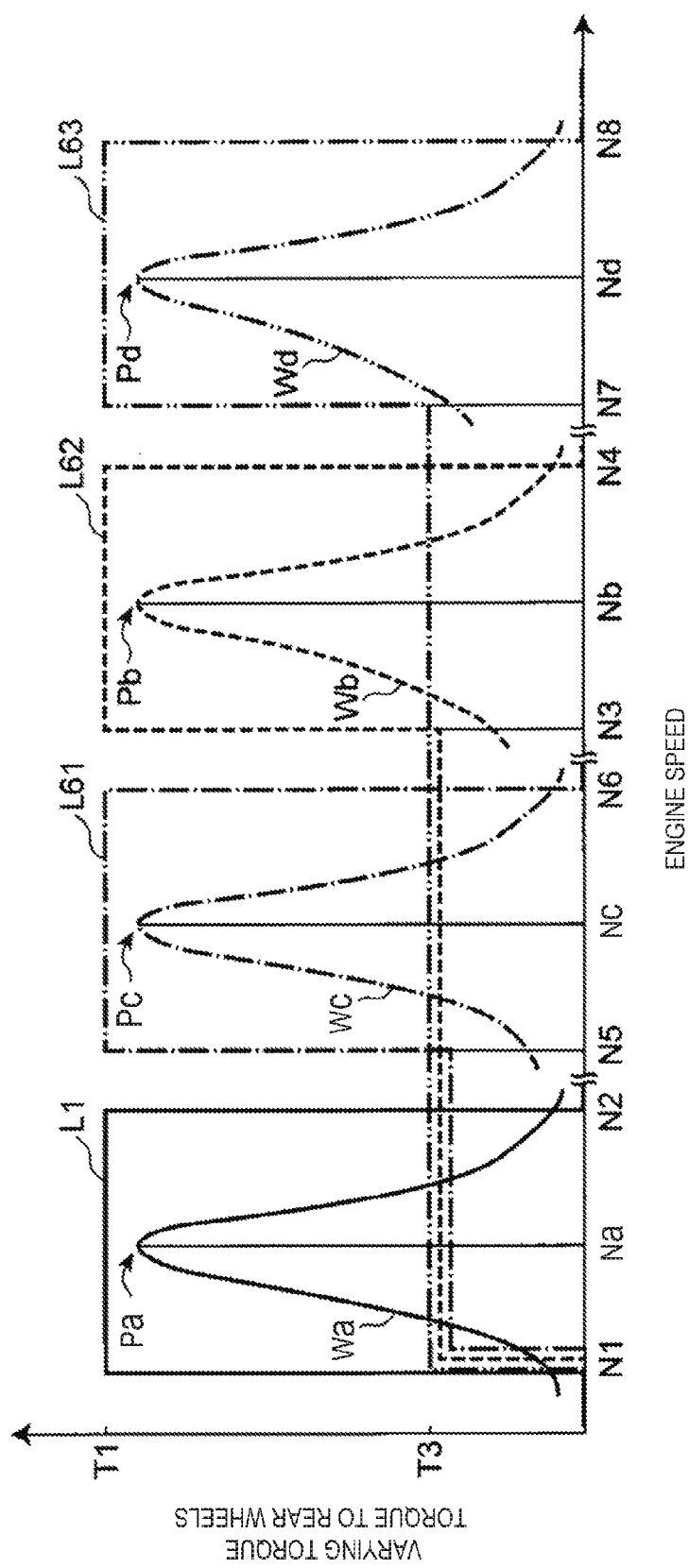
FIG. 15 is a chart illustrating a relationship between an engine speed and a varying torque of a drivetrain or a torque applied to the rear wheels, in a four-wheel drive vehicle according to a seventh embodiment of the present invention.

FIG. 15 is a chart illustrating a relationship between an engine speed and a varying torque of a drivetrain or a torque applied to the rear wheels, in a four-wheel drive vehicle according to a seventh embodiment of the present invention. It will be noted that in FIG. 15, for easier understanding, the torques to the rear wheels in the one-cylinder-reduced operating mode and the two-cylinder-reduced operating mode are partially shifted so that they are not overlapped.

The four-wheel drive vehicle of the seventh embodiment is substantially the same as the four-wheel drive vehicle of the sixth embodiment except that the relationship between the engine speed and the torque applied to the rear wheels 12R for the noise suppressing control in the reduced-cylinder operating mode is different. Therefore, description of the similar configurations between the sixth and seventh embodiments is omitted.

Also in this embodiment, as illustrated in FIG. 15, in the all-cylinder operating mode, the controller 34 performs a noise suppressing control for the all-cylinder operating mode within the first engine operating range (i.e., the operating range between the first and second engine speeds N1 and N2). Specifically, to suppress noise generation, the controller 34 increases the torque applied to the rear wheels 12R to the torque T1, indicated by the solid line L1 in FIG. 15, which exceeds the varying torque at the peak Pa of the waveform Wa.

In this embodiment, in the controller 34, an operating range that includes the engine speed Nb corresponding to the peak Pb of the waveform Wb of the varying torque and is between the first and fourth engine speeds N1 and N4 is preset and stored as a second engine operating range where the torque transmission assembly is in the noise generating state in the two-cylinder-reduced operating mode.

Further, in the controller 34, an operating range that includes the engine speed Nc corresponding to the peak Pc of the waveform Wc of the varying torque and is between the first and sixth engine speeds N1 and N6 is preset and stored as a third engine operating range where the torque transmission assembly is in the noise generating state in the one-cylinder-reduced operating mode.

Further, in the controller 34, an operating range that includes the engine speed Nd corresponding to the peak Pd of the waveform Wd of the varying torque and is between the first and eighth engine speeds N1 and N8 is preset and stored as a fourth engine operating range where the torque transmission assembly is in the noise generating state in the three-cylinder-reduced operating mode.

In the one-cylinder-reduced operating mode, the controller 34 performs a noise suppressing control for the one-cylinder-reduced operating mode within the third engine operating range (i.e., the operating range between the first and sixth engine speeds N1 and N6). Specifically, to suppress noise generation, as indicated by the one-dotted chain line L61 in FIG. 15, within the operating range between the first and fifth engine speeds N1 and N5, the controller 34 increases the torque applied to the rear wheels 12R to a torque T3, which exceeds the varying torque of the waveform Wc, and within the operating range between the fifth and sixth engine speeds N5 and N6, the controller 34 increases the torque applied to the rear wheels 12R to a torque T1, which exceeds the peak Pc of the waveform Wc and is greater than the torque T3.

Further, in the two-cylinder-reduced operating mode, the controller 34 performs a noise suppressing control for the two-cylinder-reduced operating mode within the second engine operating range (i.e., the operating range between first and fourth engine speeds N1 and N4). Specifically, to suppress noise generation, as indicated by the dashed line L62 in FIG. 15, within the operating range between the first and third engine speeds N1 and N3, the controller 34 increases the torque applied to the rear wheels 12R to the torque T3, which exceeds the varying torque of the waveform Wb, and within the operating range between the third and fourth engine speeds N3 and N4, the controller 34 increases the torque applied to the rear wheels 12R to the torque T1, which exceeds the peak Pb of the waveform Wb and is greater than the torque T3.

Further, in the three-cylinder-reduced operating mode, the controller 34 performs a noise suppressing control for the three-cylinder-reduced operating mode within the fourth engine operating range (i.e., the operating range between first and eighth engine speeds N1 and N8). Specifically, to suppress noise generation, as indicated by the two-dotted chain line L63 in FIG. 15, within the operating range between the first and seventh engine speeds N1 and N7, the controller 34 increases the torque applied to the rear wheels 12R to the torque T3, which exceeds the varying torque of the waveform Wd, and within the operating range between the seventh and eighth engine speeds N7 and N8, the controller 34 increases the torque applied to the rear wheels 12R to the torque T1, which exceeds the peak Pd of the waveform Wd and is greater than the torque T3.

In addition to the waveforms Wa, Wb, Wc, and Wd of the varying torque of the drivetrain of the four-wheel drive vehicle 10, it will be appreciated that relationships between the engine speed and the torque applied to the rear wheels 12R for the noise suppressing controls in the all-cylinder and reduced-cylinder operating modes, respectively, are also preset and stored in the controller 34.

Also in this embodiment, the controller 34 changes the torque applied to the rear wheels 12R according to the operating ranges where the torque transmission assembly is in the noise generating state in the all-cylinder and reduced-cylinder operating modes, respectively.

Thus, the four-wheel drive vehicle of this embodiment also includes the controller 34 that executes the noise suppression module for increasing the torque applied to the rear wheels 12R in the all-cylinder and reduced-cylinder operating modes so as to suppress noise generation at the torque transmission assembly. The controller 34 that executes the noise suppression module changes the torque applied to the rear wheels 12R according to the operating ranges where the torque transmission assembly is in the noise generating state in the all-cylinder and reduced-cylinder operating modes, respectively. As a result, noise generation in the all-cylinder and reduced-cylinder operating modes can be suppressed while suppressing the degradation of fuel economy.

Also in the four-wheel drive vehicle of the seventh embodiment, similarly to the four-wheel drive vehicle of the fifth embodiment, during the change of the operating mode, within the operating range where the torque applied to the rear wheels 12R is increased during the change of the operating mode, the torque applied to the rear wheels 12R may temporarily be increased to be higher than the torque that is applied in the operating mode after the change is completed, and within the operating range where the torque applied to the rear wheels 12R is reduced during the change, the torque applied to the rear wheels 12R may temporarily be reduced to be lower than the torque applied to the rear wheels 12R that is applied in the operating mode after the change is completed.

Figure 16:
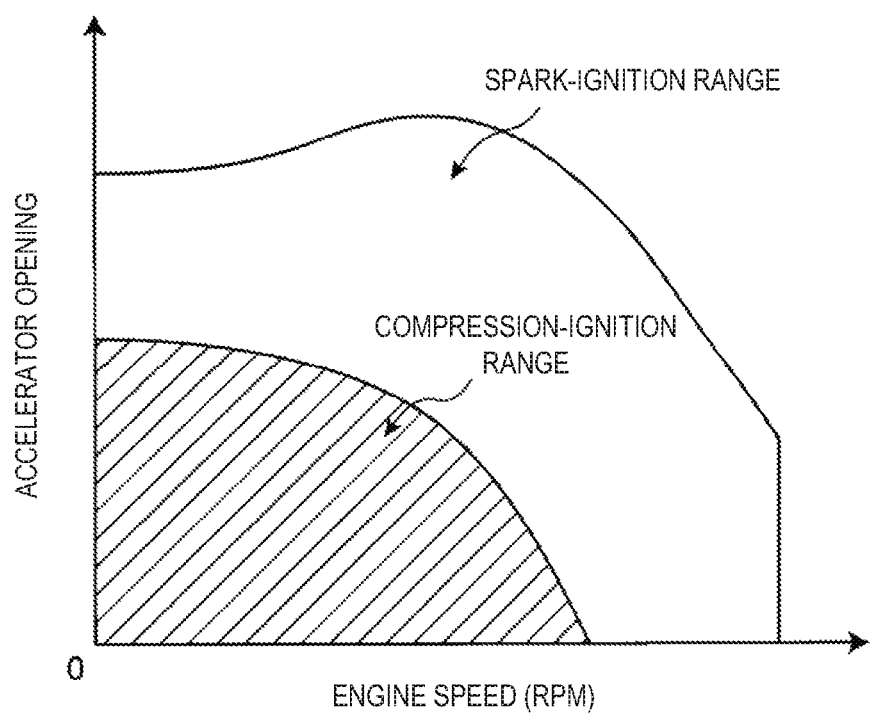
FIG. 16 is a chart illustrating a relationship between an engine speed and an accelerator opening with a combustion mode, in a four-wheel drive vehicle according to an eighth embodiment of the present invention.

FIG. 16 is a chart illustrating a relationship between an engine speed and an accelerator opening with a combustion mode, in a four-wheel drive vehicle according to an eighth embodiment of the present invention. The four-wheel drive vehicle of the eighth embodiment is configured to have substantially the same configuration as the four-wheel drive vehicle 10 of the first embodiment, and additionally, a combustion mode of the engine 14 is switchable between a spark-ignition mode and a compression-ignition mode.

In the spark-ignition mode, fuel inside a combustion chamber of the engine 14 is gradually combusted as flames propagate from the periphery of an ignition plug of the engine 14. In the compression-ignition mode, a mixture gas of air and the fuel inside the cylinder is compressed to cause self-ignition of the fuel and starts combustion throughout the entirety of the inside of the combustion chamber substantially at the same time. In the compression-ignition mode, the combustion progresses faster compared to the spark-ignition mode, and therefore, the varying torque of the engine 14 becomes larger.

The controller 34 stores a combustion mode map as illustrated in FIG. 16, indicating a relationship between the engine speed and the accelerator opening with respect to the combustion modes, specifically, to the spark-ignition mode and the compression-ignition mode. The controller 34 switches the combustion mode of the engine 14 between the spark-ignition mode and the compression-ignition mode based on the engine speed and the accelerator opening by using the combustion mode map.

In this embodiment, as illustrated in FIG. 16, a spark-ignition range where the combustion mode is the spark-ignition mode is preset on a high engine-speed and high engine-load side, and a compression-ignition range where the combustion mode is the compression-ignition mode is preset on a low engine-speed and low engine-load side.

The engine 14 is further switchable between the all-cylinder operating mode and the reduced-cylinder operating mode. The combustion mode map in FIG. 16 is combined with the operating mode map and, although not illustrated, it will be appreciated that each of the spark-ignition range and the compression-ignition range is further divided into all-cylinder and reduced-cylinder operation segments.

The controller 34 switches the combustion mode of the engine 14 between the spark-ignition and compression-ignition modes and also switches the operating mode of the engine 14 between the all-cylinder and reduced-cylinder operating modes, based on the engine speed and the accelerator opening by using a combined map including the combustion mode map and the operating mode map.

Further, in both of the spark-ignition and compression-ignition modes, the controller 34 increases the torque applied to the rear wheels 12R to suppress noise generation at the torque transmission assembly.

In the spark-ignition mode, to suppress noise generation, the controller 34 increases the torque applied to the rear wheels 12R within the operating range where the torque transmission assembly is in the noise generating state in the spark-ignition mode. In the compression-ignition mode, to suppress noise generation, the controller 34 increases the torque applied to the rear wheels 12R within the operating range where the torque transmission assembly is in the noise generating state in the compression-ignition mode.

In the compression-ignition mode, since the varying torque of the engine 14 becomes larger compared to the spark-ignition mode, the controller 34 adjusts the torque applied to the rear wheels 12R, which is increased to suppress noise generation, to be larger in the compression-ignition mode than in the spark-ignition mode.

Thus, the controller 34 changes the torque applied to the rear wheels 12R according to the operating ranges where the torque transmission assembly is in the noise generating state in the spark-ignition and compression-ignition modes, respectively.

Figure 17B:
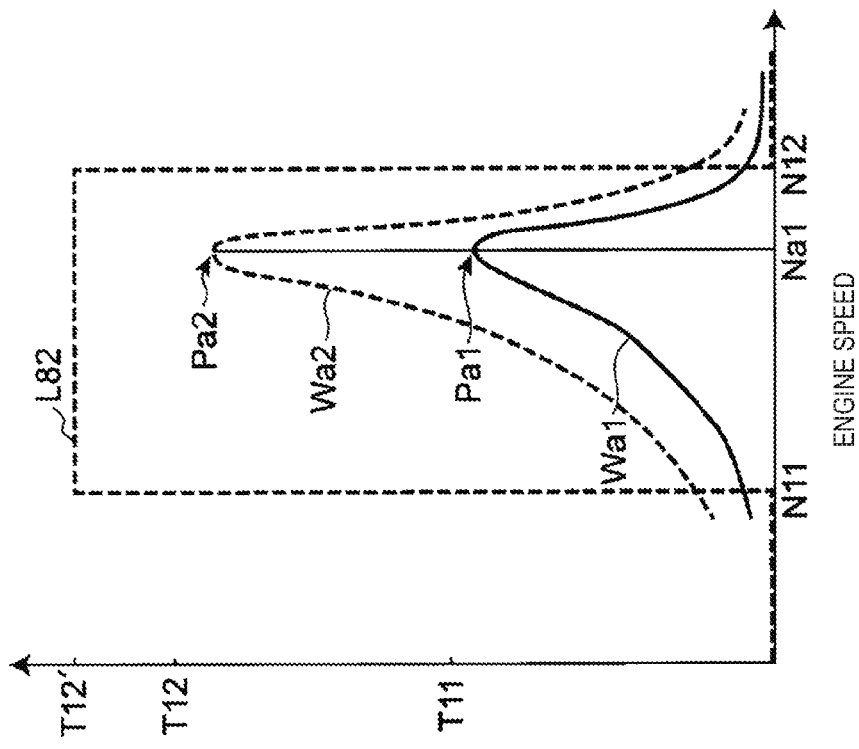
FIGS. 17A and 17B are charts illustrating relationships between the engine speed and a varying torque of a drivetrain or a torque applied to the rear wheels, in the four-wheel drive vehicle.
Figure 17A:
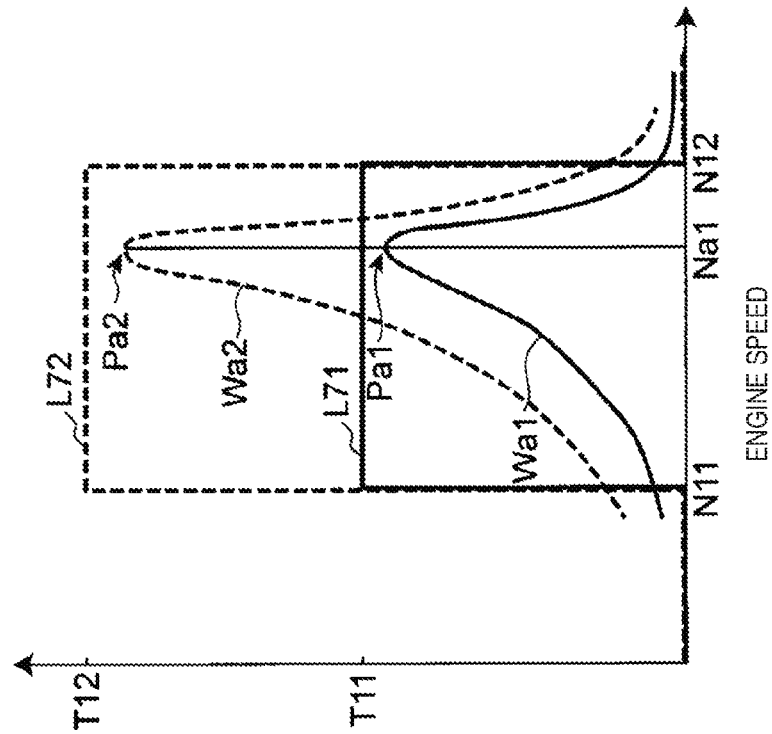
Figure 18:
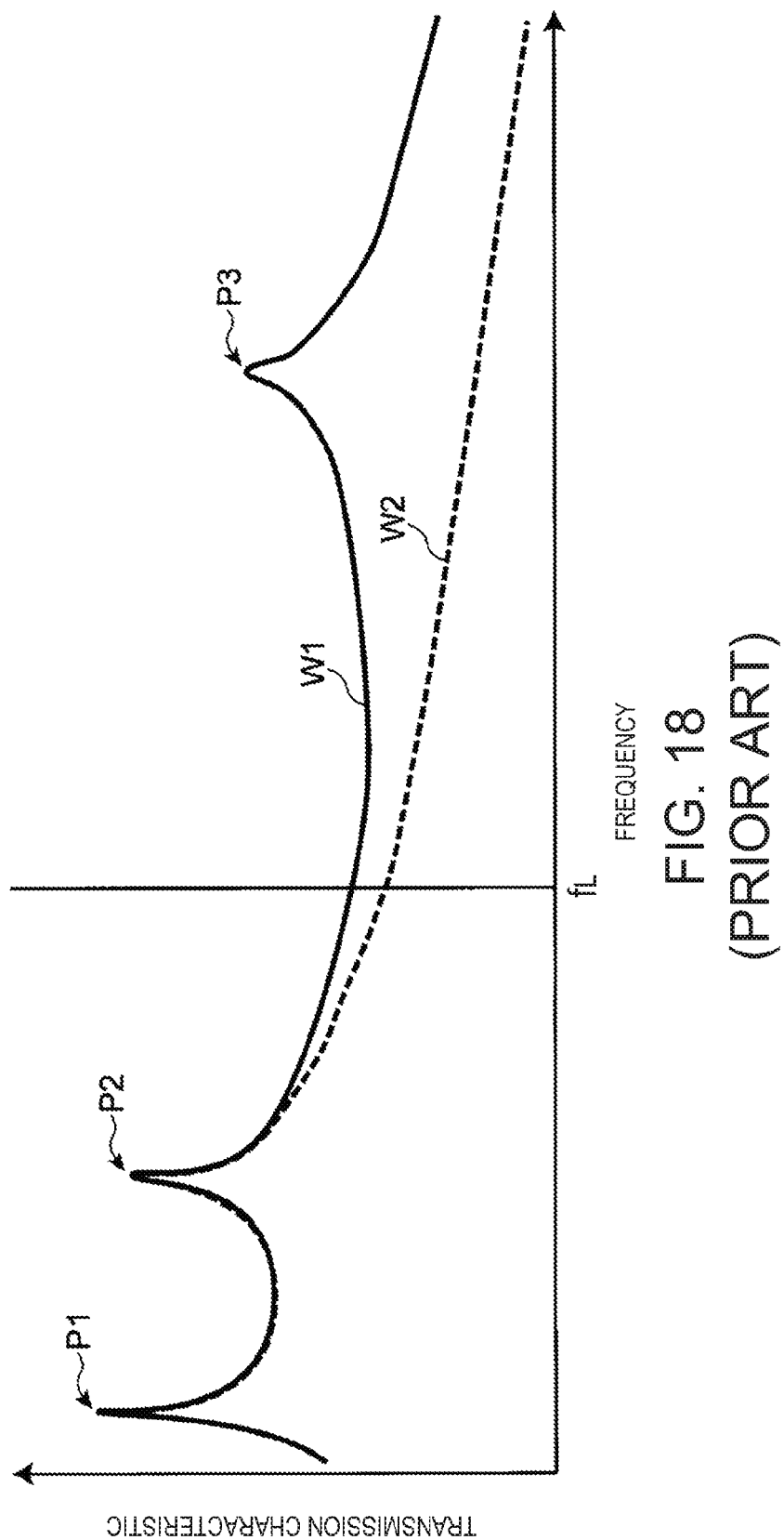
FIG. 18 is a chart illustrating relationships between a frequency of torque variation of an engine and a torque transmission characteristic with respect to the torsional vibration of a drivetrain, in a four-wheel drive vehicle and a two-wheel drive vehicle having conventional basic structures, respectively.

FIGS. 17A and 17B are charts illustrating relationships between the engine speed and the varying torque of the drivetrain or the torque applied to the rear wheels, in the four-wheel drive vehicle. FIG. 17A illustrates the torques applied to the rear wheels in the spark-ignition and compression-ignition modes during the all-cylinder operating mode, and FIG. 17B illustrates the torques applied to the rear wheels during a change of the combustion mode in the all-cylinder operating mode. In FIGS. 17A and 17B, a waveform of the varying torque of the drivetrain in the spark-ignition mode during the all-cylinder operating mode is indicated by the solid line Wa1, and a waveform of the varying torque of the drivetrain in the compression-ignition mode during the all-cylinder operating mode is indicated by the dashed line Wa2.

As illustrated in FIGS. 17A and 17B, the waveform Wa1 of the varying torque of the spark-ignition mode has a peak Pa1 at a predetermined engine speed Na1, and the waveform Wa2 of the varying torque of the compression-ignition mode has a peak Pa2, which is higher than the peak Pa1 of the waveform Wa1 of the varying torque of the spark-ignition mode, at the same engine speed Na1 as the waveform Wa1.

In the controller 34, an operating range that includes the engine speed Na1 corresponding to the peaks Pa1 and Pa2 of the waveforms Wa1 and Wa2 of the varying torque and is between a predetermined first engine speed N11 and a predetermined second engine speed N12 that is higher than the first engine speed N11 is preset and stored as an operating range where the torque transmission assembly is in the noise generating state in the spark-ignition and compression-ignition modes during the all-cylinder operating mode.

In the spark-ignition mode, the controller 34 performs a noise suppressing control for the spark-ignition mode within the operating range between the first and second engine speeds N11 and N12. Specifically, to suppress noise generation, the controller 34 increases the torque applied to the rear wheels 12R to a torque T11 which exceeds the varying torque at the peak Pa1 of the waveform Wa1 as indicated by the solid line L71 in FIG. 17A.

Further, in the compression-ignition mode, the controller 34 performs a noise suppressing control for the compression-ignition mode within the operating range between the first and second engine speeds N11 and N12. Specifically, to suppress noise generation, the controller 34 increases the torque applied to the rear wheels 12R to a torque T12 which exceeds the varying torque at the peak Pa2 of the waveform Wa2 as indicated by the dashed line L72 in FIG. 17A.

Moreover, in the all-cylinder operating mode, when switching from the spark-ignition mode to the compression-ignition mode, the controller 34 temporarily changes the torque applied to the rear wheels 12R based on a preset combustion mode switching torque map indicating a relationship between the engine speed and the torque applied to the rear wheels 12R, and then the controller 34 changes the torque applied to the rear wheels 12R to the target torque for the combustion mode after the switch is completed.

As indicated by the dashed line L82 in FIG. 17B, the combustion mode switching torque map for switching from the spark-ignition mode to the compression-ignition mode is preset so that the torque applied to the rear wheels 12R is changed to a torque T12', which is higher than the torque T12 supplied after the switch is completed, within an operating range where the torque applied to the rear wheels 12R is increased by the switch (i.e., from the spark-ignition mode to the compression-ignition mode), in other words, the operating range between the first and second engine speeds N11 and N12.

In the all-cylinder operating mode, when switching from the spark-ignition mode to the compression-ignition mode, within the operating range between the first and second engine speeds N11 and N12, the controller 34 temporarily increases the torque applied to the rear wheels 12R to be the torque T12' which is higher than the torque T12 supplied after the switch is completed, and then changes the torque applied to the rear wheels 12R to the torque T12, based on the combustion mode switching torque map for switching from the spark-ignition mode to the compression-ignition mode.

In addition to the waveforms Wa1 and Wa2 of the varying torque of the drivetrain of the four-wheel drive vehicle 10, it will be appreciated that relationships between the engine speed and the torque applied to the rear wheels 12R for the noise suppressing controls in the spark-ignition and compression-ignition modes, respectively, and a relationship between the engine speed and the torque applied to the rear wheels 12R when switching from the spark-ignition mode to the compression-ignition mode during the all-cylinder operating mode, are also preset and stored in the controller 34.

In this embodiment, in both of the spark-ignition and compression-ignition modes during the all-cylinder operating mode, the torque applied to the rear wheels 12R is changed, and when switching from the spark-ignition mode to the compression-ignition mode during the all-cylinder operating mode, within the operating range where the torque applied to the rear wheels 12R in the compression-ignition mode is increased to be higher than that in the spark-ignition mode, the torque applied to the rear wheels 12R is temporarily increased to be higher than that in the compression-ignition mode. Also during the reduced-cylinder operating mode, in both of the spark-ignition and compression-ignition modes, the torque applied to the rear wheels 12R is changed, and when switching from the spark-ignition mode to the compression-ignition mode during the reduced-cylinder operating mode, within the operating range where the torque applied to the rear wheels 12R in the compression-ignition mode is increased to be higher than that in the spark-ignition mode, the torque applied to the rear wheels 12R is temporarily increased to be higher than that in the compression-ignition mode.

Further, when switching from the spark-ignition mode during all-cylinder operating mode to the compression-ignition mode during the reduced-cylinder operating mode, and when switching from the spark-ignition mode during reduced-cylinder operating mode to the compression-ignition mode during the all-cylinder operating mode, within the operating range where the torque applied to the rear wheels 12R in the compression-ignition mode is increased to be higher than that in the spark-ignition mode, the torque applied to the rear wheels 12R is also temporarily increased to be higher than that in the compression-ignition mode in a similar manner.

Thus, the four-wheel drive vehicle of this embodiment also includes the controller 34 that executes the noise suppression module for increasing the torque applied to the rear wheels 12R in the all-cylinder and reduced-cylinder operating modes to suppress noise generation at the torque transmission assembly. The controller 34 that executes the noise suppression module changes the torque applied to the rear wheels 12R according to the operating ranges where the torque transmission assembly is in the noise generating state in the all-cylinder and reduced-cylinder operating modes, respectively. As a result, noise generation in the all-cylinder and reduced-cylinder operating modes can be suppressed while suppressing the degradation of fuel economy.

Further, the controller 34 that executes the noise suppression module changes the torque applied to the rear wheels 12R in the spark-ignition and compression-ignition modes. By increasing the torque applied to the rear wheels 12R in the compression-ignition mode, where the torque variation becomes larger than in the spark-ignition mode, to be higher than that in the spark-ignition mode, noise generation can be suppressed in each combustion mode while suppressing the degradation of fuel economy.

Moreover, when switching from the spark-ignition mode to the compression-ignition mode, the controller 34 that executes the noise suppression module temporarily increases the torque applied to the rear wheels 12R to be higher than that applied in the compression-ignition mode within the operating range where the torque applied to the rear wheels 12R is increased. Thus, the torque applied to the rear wheels 12R can be swiftly increased to the torque applied in the compression-ignition mode, and noise generation due to the response lag in the control of the torque increase to the rear wheels 12R can be suppressed.

Figure 20:
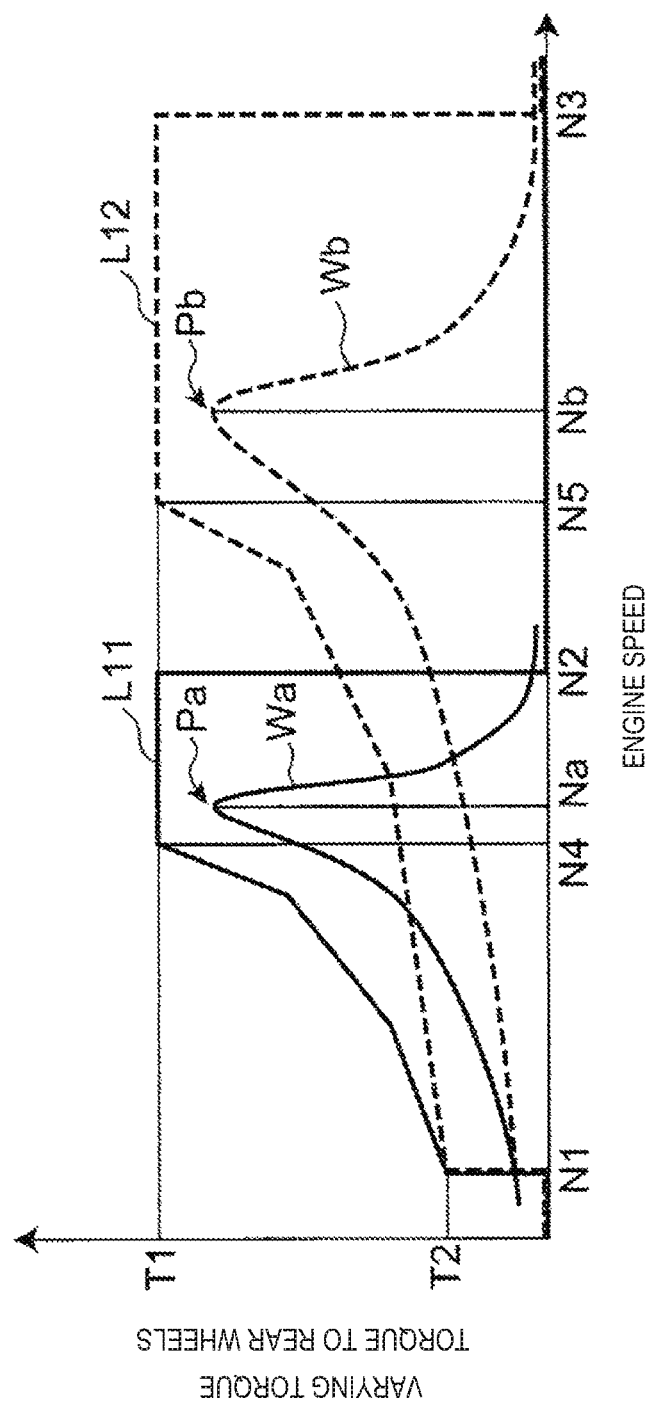
FIG. 20 is a chart illustrating relationships between an engine speed and a varying torque of a drivetrain or a torque applied to the rear wheels, in a four-wheel drive vehicle according to a ninth embodiment of the present invention.

Referring to FIG. 20, a chart is illustrated showing a relationship of an engine speed with a varying torque of a drivetrain and a torque applied to the rear wheels, in a four-wheel drive vehicle according to a ninth embodiment of the present invention. The four-wheel drive vehicle of the ninth embodiment is substantially the same as the four-wheel drive vehicle 10 of the first embodiment except that the torque distributed to the rear wheels 12R is different between the first engine operating range of the all-cylinder operating mode and the second engine operating range of the reduced-cylinder operating mode. Therefore, description of the similar configurations between the first and ninth embodiments is omitted.

Also in this embodiment, as illustrated in FIG. 20, in the all-cylinder operating mode, the controller 34 performs the noise suppressing control for the all-cylinder operating mode within the first engine operating range (i.e., the operating range between the first and second engine speeds N1 and N2). Specifically, to suppress noise generation, the controller 34 increases, via the coupling 28, the torque applied to the rear wheels 12R to torques indicated by the solid line L11 in FIG. 20.

The controller 34 controls the torque to be a torque T2 at the first engine speed N1, increases the torque as the engine speed becomes higher from the first engine speed N1, and keeps the torque at the torque T1 from a predetermined fourth engine speed N4, which is between the first and second engine speeds N1 and N2, to the second engine speed N2.

Further, in the reduced-cylinder operating mode, the controller 34 performs the noise suppressing control for the reduced-cylinder operating mode within the second engine operating range (i.e., the operating range between the first and third engine speeds N1 and N3). Specifically, to suppress noise generation, the controller 34 increases, via the coupling 28, the torque applied to the rear wheels 12R to torques indicated by the dashed line L12 in FIG. 20.

The controller 34 controls the torque to be the torque T2 at the first engine speed N1, increases the torque as the engine speed becomes higher from the first engine speed N1, and keeps the torque at the torque T1 from a predetermined sixth engine speed N5, which is between the first and third engine speeds N1 and N3, to the third engine speed N3.

Also in this embodiment, whether or not the engine is in the all-cylinder operating mode is determined by the controller 34. If the engine is determined to be in the all-cylinder operating mode, the noise suppressing control for the all-cylinder operating mode is performed, and if the engine is determined to be in the reduced-cylinder operating mode, the noise suppressing control for the reduced-cylinder operating mode is performed. Further, the controller 34 controls the operation of the engine 14 by switching its operating mode between the all-cylinder and reduced-cylinder operating modes based on the engine speed and the accelerator opening by using the operating mode map.

As described above, the four-wheel drive vehicle 10 of this embodiment also includes the controller 34 that executes the noise suppression module for increasing the torque applied to the rear wheels 12R in the all-cylinder operating mode within the first engine operating range where the torque transmission assembly is in the noise generating state in the all-cylinder operating mode, so as to suppress noise generation. To suppress noise generation in the reduced-cylinder operating mode, the controller 34 that executes the noise suppression module increases the torque applied to the rear wheels 12R within the second engine operating range that is on the higher engine speed side of the first engine operating range and includes the operating range where the torque transmission assembly is in the noise generating state in the reduced-cylinder operating mode.

Since the torque applied to the rear wheels 12R is increased within the respective operating ranges where the torque transmission assembly is in the noise generating state in the all-cylinder and reduced-cylinder operating modes so as to suppress noise generation, in the four-wheel drive vehicle 10 provided with the engine 14 of which an operating mode is switchable between the all-cylinder and reduced-cylinder operating modes, noise generation can be suppressed in the all-cylinder and reduced-cylinder operating modes.

Further in the four-wheel drive vehicle of this embodiment, compared to the first embodiment, the torques to the rear wheels 12R within the operating range between the first and fourth engine speeds N1 and N4 in the all-cylinder operating mode and within the operating range between the first and fifth engine speeds N1 and N5 in the reduced-cylinder operating mode can be lower. Thus, the degradation of fuel economy can be further suppressed.

In this embodiment, in a case where a request for shifting the operating mode of the engine to the all-cylinder operating mode is issued to the controller 34 in the reduced-cylinder operating mode within part of the second engine operating range overlapping with the first engine operating range (i.e., within the operating range between the first and second engine speeds N1 and N2), the operating mode may be shifted to the all-cylinder operating mode after the torque applied to the rear wheels 12R is adjusted so as to suppress noise generation within the first engine operating range in the all-cylinder operating mode, in other words, to the torque indicated by the solid line L11 in FIG. 20.

In this case, an occurrence of a situation where the torque transmission assembly is in the noise generating state before the torque applied to the rear wheels 12R is increased can be suppressed, and noise generation can be suppressed more effectively. It will be noted that whether or not the request for shifting to the all-cylinder operating mode is issued is determined based on the engine speed and the accelerator opening by using the operating mode map.

Further in this embodiment, in a case where a request for shifting the operating mode of the engine to the reduced-cylinder operating mode is issued to the controller 34 in the all-cylinder operating mode within part of the second engine operating range on the higher engine speed side of the first engine operating range (i.e., within the operating range between the second and third engine speeds N2 and N3), the operating mode may be shifted to the reduced-cylinder operating mode after the torque applied to the rear wheels 12R is adjusted so as to suppress noise generation within the second engine operating range in the reduced-cylinder operating mode, in other words, to the torque indicated by the dashed line L12 in FIG. 20.

In this case, an occurrence of a situation where the torque transmission assembly is in the noise generating state before the torque applied to the rear wheels 12R is increased can be suppressed, and noise generation can be suppressed more effectively. It will be noted that whether or not the request for shifting to the reduced-cylinder operating mode is issued is determined based on the engine speed and the accelerator opening by using the operating mode map.

Figure 21:
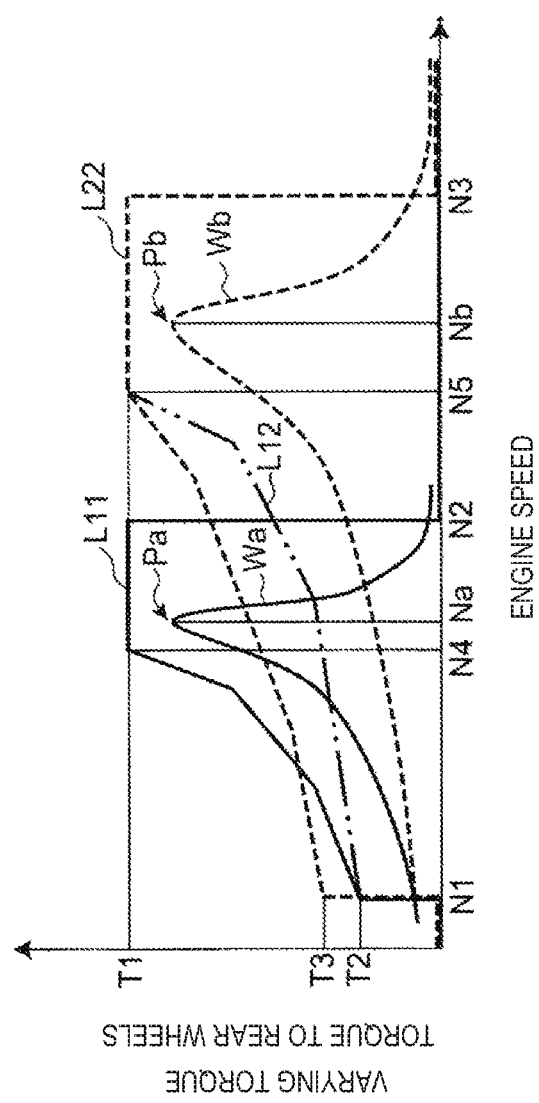
FIG. 21 is a chart illustrating relationships between an engine speed and a varying torque of a drivetrain or a torque applied to the rear wheels, in a four-wheel drive vehicle according to a tenth embodiment of the present invention.

Referring to FIG. 21, a chart is illustrated showing a relationship of an engine speed with a varying torque of a drivetrain and a torque applied to the rear wheels, in a four-wheel drive vehicle according to a tenth embodiment of the present invention. The four-wheel drive vehicle of the tenth embodiment is substantially the same as the four-wheel drive vehicle 10 of the ninth embodiment except that the torque distributed to the rear wheels 12R is different in the second engine operating range of the reduced-cylinder operating mode. Therefore, description of the similar configurations between the ninth and tenth embodiments is omitted.

Referring to FIG. 21, also in this embodiment, a noise suppressing control in the reduced-cylinder mode is performed within the second engine operating range (the engine operating range between the first engine speed N1 and the third engine speed N3). The torque applied to the auxiliary drive wheels 12R may be increased, via the coupling 28, to a torque that is illustrated by the dashed line L22 of FIG. 21, which achieves excellent noise suppression.

At the first engine speed N1, the controller 34 executes the noise suppression module to cause the torque adjusting device to increase the torque ratio applied to the auxiliary drive wheels 12R to be at torque T3, which is higher than the larger than torque T2, which is the value to which the torque ratio applied to the auxiliary drive wheels 12R is increased to suppress noise generation. Subsequently, the controller 34 executes the noise suppression module to continue causing the torque adjusting device to increase the torque ratio as the engine speed increases from the first engine speed N1 until the fifth engine speed N5, when the noise suppression module cause the torque adjusting device to maintain the torque ratio applied to the auxiliary drive wheels 12R at torque T1 within the engine speed range from the fifth engine speed N5 to the third engine speed N3.

In accordance with the tenth embodiment, in the reduced-cylinder operating mode, within a part of the second engine operating range where the engine speed is below an engine speed N5, at which the torque ratio, applied to the auxiliary drive wheels 12R and increased to suppress noise generation, takes a largest value, in an operating range between the first engine speed N1 and the fifth engine speed N5, the controller 34 that executes the noise suppression module may cause the torque adjusting device to increase the torque ratio applied to the auxiliary drive wheels 12R to be at a larger torque value (as illustrated by the torque represented by dashed line L22) than a value (as illustrated by the torque represented by the two-dotted chain line L12 corresponding to the dashed line L12 in FIG. 20) to which the torque ratio applied to the auxiliary drive wheels 12R is increased to suppress noise generation.

In accordance with this embodiment, the controller 34 determines whether the engine 14 is in an all-cylinder operating mode or the reduced-cylinder operating mode. When the controller 34 determines that the engine 14 is in the all-cylinder operating mode, noise suppressing control is carried out in accordance with the all-cylinder operating mode. When the controller 34 determines that the engine 14 is in the reduced-cylinder operating mode, noise suppressing control is carried out in accordance with the reduced-cylinder operating mode. Further, the controller 34 may control the operation of the engine 14 by switching its operating mode between the all-cylinder and reduced-cylinder operating modes based on the engine speed and the accelerator opening by using the operating mode map.

In accordance with the above configuration, the controller 34 is provided to execute the noise suppression module and causes the torque adjusting device to increase the torque ratio applied to the auxiliary drive wheels 12R within a first engine operating range, where the torque transmission assembly is in a noise generating state in the all-cylinder operating mode. Within the reduced-cylinder operating mode, the controller 34 executes the noise suppression module and causes the torque adjusting device to increase the torque ratio applied to the auxiliary drive wheels 12R within a second engine operating range that is on a higher engine speed side of the first engine operating range and includes an engine operating range where the torque transmission assembly is in the noise generating state in the reduced-cylinder operating mode.

In accordance with the above embodiments, the torque ratio applied to the auxiliary drive wheels 12R is increased such that noise generation is suppressed within engine operating ranges in both the all-cylinder operating mode and the reduced-cylinder operating mode. Thus, it is possible to suppress noise during any operating mode in a four-wheel vehicle with an engine that is switchable between an all-cylinder mode and a reduced-cylinder mode.

Further, in the reduced-cylinder operating mode, within a part of the second engine operating range where the engine speed is below an engine speed N5, at which the torque ratio, applied to the auxiliary drive wheels 12R and increased to suppress noise generation, takes a largest value, the controller 34 that executes the noise suppression module may cause the torque adjusting device to increase the torque ratio applied to the auxiliary drive wheels 12R to be at a larger torque value than a value to which the torque ratio applied to the auxiliary drive wheels 12R is increased to suppress noise generation. In accordance with such a configuration, even when a driver rapidly steps on the accelerator while changing operating ranges or switching to an all-cylinder mode from the reduced-cylinder mode, since the torque transmission assembly is prevented from being in a noise-generating state before the torque to the auxiliary drive wheels is increased to suppress noise, the noise suppression can be further enhanced.

In the embodiments described above, the four-cylinder engines of which an operating mode is switchable between the all-cylinder operating mode and the reduced-cylinder operating mode are described. However, the present invention can be similarly applied to various multi-cylinder engines of which an operating mode is switchable between an all-cylinder operating mode and a reduced-cylinder operating mode, such as a three-cylinder engine of which an operating mode is switchable between an all-cylinder operating mode where the three cylinders are operated and a reduced-cylinder operating mode where one or two of the cylinders is operated, and a six-cylinder engine of which an operating mode is switchable among an all-cylinder operating mode where the six cylinders are operated and reduced-cylinder operating modes where one, two, three, four, and five of the cylinders are operated, respectively.

Note that in the embodiments described above, the four-wheel drive vehicles having the front wheels 12F as the main drive wheels and the rear wheels 12R as the auxiliary drive wheels are described. However, the present invention can be similarly applied to four-wheel drive vehicles having the rear wheels 12R as the main drive wheels and the front wheels 12F as the auxiliary drive wheels.

The present invention is not limited to the above illustrative embodiments, and without departing from the scope of the present invention, various enhancements and various modifications in design can be made.

As described above, according to the present invention, a generation of noise can be suppressed in all-cylinder and reduced-cylinder operating modes of four-wheel drive vehicles while suppressing the degradation of fuel economy. Therefore, the present invention can suitably be used in the fields of manufacturing industries of four-wheel drive vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS 10, 40, 50 Four-wheel Drive Vehicle
12F Front Wheel
12R Rear Wheel
1 Engine
15 Output gear
16 Transmission
17 Transmission case
18, 24 Axle
19 Damper
20 Front-wheel Differential Device
22 Transfer Case
26 Rear-wheel Differential Device
28 Coupling
30 Propeller Shaft
34 Controller
3 Accelerator Opening Sensor
38 Engine Speed Sensor
41 Differential case
42 Input case
43 Differential mechanism
45 Pendulum Absorber (Damper)
46 Elastic annular member
51 First bevel gear
51a Inner-circumferential gear part
51b Outer-circumferential gear part
52 Second bevel gear
53 Output shaft

What is claimed is:

1. A four-wheel drive vehicle, comprising:
an engine configured with an operating mode that is switchable between an all-cylinder operating mode and a reduced-cylinder operating mode;
a torque transmission assembly configured to transmit an output torque of the engine to main drive wheels and auxiliary drive wheels;
a torque ratio adjusting device included within the torque transmission assembly, configured to adjust a ratio of the output torque that is distributed to the auxiliary drive wheels; and
a controller that executes a noise suppression module to cause the torque ratio adjusting device to increase a torque ratio applied to the auxiliary drive wheels, so as to suppress a generation of noise at the torque transmission assembly in the all-cylinder and reduced-cylinder operating modes,
wherein the controller that executes the noise suppression module causes the torque ratio adjusting device to change the torque ratio applied to the auxiliary drive wheels according to engine operating ranges in which the torque transmission assembly is in a noise generating state in the all-cylinder and reduced-cylinder operating modes, and
wherein when a change from a first operating mode to a second operating mode, the change being selected from a group consisting of a change from the all-cylinder operating mode to the reduced-cylinder operating mode and a change from the reduced-cylinder operating mode to the all-cylinder operating mode, within an engine operating range where the torque ratio applied to the auxiliary drive wheels is increased by the change to be larger in the second operating mode after the change than in the first operating mode before the change, the controller that executes the noise suppression module causes the torque ratio adjusting device to temporarily increase the torque ratio applied to the auxiliary drive wheels to be larger than the torque ratio applied in the second operating mode after the change.

2. The four-wheel drive vehicle of claim 1, further comprising a damper configured to suppress the generation of noise by the torque transmission assembly in the reduced-cylinder operating mode,
wherein the controller that executes the noise suppression module causes the torque ratio adjusting device to increase the torque ratio applied to the auxiliary drive wheels to suppress the noise generation to a value that is smaller in the reduced-cylinder operating mode than in the all-cylinder operating mode.

3. The four-wheel drive vehicle of claim 2, wherein the damper is a centrifugal pendulum absorber.

4. The four-wheel drive vehicle of claim 3, wherein in the change from the first operating mode to the second operating mode, within an engine operating range where the torque ratio applied to the auxiliary drive wheels is reduced to be smaller in the second operating mode after the change than in the first operating mode before the change, the controller that executes the noise suppression module causes the torque ratio adjusting device to temporarily reduce the torque ratio applied to the auxiliary drive wheels to be smaller than the torque ratio applied in the second operating mode after the change.

5. The four-wheel drive vehicle of claim 4, wherein in the change from the all-cylinder operating mode to the reduced-cylinder operating mode, the controller that executes the noise suppression module causes the torque ratio adjusting device to temporarily change the torque ratio applied to the auxiliary drive wheels based on an operating mode changing torque map in which a relationship between a speed of the engine and the torque ratio applied to the auxiliary drive wheels in the change from the all-cylinder operating mode to the reduced-cylinder operating mode is preset, and in the change from the reduced-cylinder operating mode to the all-cylinder operating mode, the controller that executes the noise suppression module causes the torque ratio adjusting device to temporarily change the torque ratio applied to the auxiliary drive wheels based on the operating mode changing torque map in which a relationship between an engine speed and the torque ratio applied to the auxiliary drive wheels in the change from the reduced-cylinder operating mode to the all-cylinder operating mode is preset.

6. The four-wheel drive vehicle of claim 5,
wherein the engine is further configured with a combustion mode that is switchable between a spark-ignition mode and a compression-ignition mode, and
wherein the controller that executes the noise suppression module causes the torque ratio adjusting device to change the torque ratio applied to the auxiliary drive wheels in the spark-ignition mode and the compression-ignition mode.

7. The four-wheel drive vehicle of claim 6, wherein when a switch from the spark-ignition mode to the compression-ignition mode occurs within an engine operating range where the torque ratio applied to the auxiliary drive wheels is to be increased to be larger in the compression-ignition mode than in the spark-ignition mode, the controller that executes the noise suppression module causes the torque ratio adjusting device to temporarily increase the torque ratio applied to the auxiliary drive wheels to be larger than a torque ratio applied after the switch in the compression-ignition mode.

8. The four-wheel drive vehicle of claim 7, wherein to suppress the noise generation,
in the all-cylinder operating mode, the controller that executes the noise suppression module causes the torque ratio adjusting device to increase the torque ratio applied to the auxiliary drive wheels within a first engine operating range where the torque transmission assembly is in the noise generating state in the all-cylinder operating mode, and
in the reduced-cylinder operating mode, the controller that executes the noise suppression module causes the torque ratio adjusting device to increase the torque ratio applied to the auxiliary drive wheels within a second engine operating range that is on a higher engine speed side of the first engine operating range and includes an engine operating range where the torque transmission assembly is in the noise generating state in the reduced-cylinder operating mode.

9. The four-wheel drive vehicle of claim 8, wherein the first engine operating range is an engine operating range between a predetermined first engine speed and a predetermined second engine speed that is above the predetermined first engine speed and wherein the torque transmission assembly is in the noise generating state in the all-cylinder operating mode in the first engine operating range,
wherein the second engine operating range is an engine operating range between the first engine speed and a predetermined third engine speed that is above the predetermined second engine speed, and
wherein in the reduced-cylinder operating mode, within a part of the second engine operating range where the engine speed is below an engine speed at which the torque ratio, applied to the auxiliary drive wheels and increased to suppress the noise generation, takes a largest value, the controller that executes the noise suppression module causes the torque ratio adjusting device to increase the torque ratio applied to the auxiliary drive wheels to be larger than a value to which the torque ratio applied to the auxiliary drive wheels is increased to suppress the noise generation.

10. The four-wheel drive vehicle of claim 9, wherein when a request for shifting the operating mode of the engine to the all-cylinder operating mode is issued in the reduced-cylinder operating mode within a part of the second engine operating range overlapping with the first engine operating range, the operating mode is shifted to the all-cylinder operating mode after the controller that executes the noise suppression module causes the torque ratio adjusting device to adjust the torque ratio applied to the auxiliary drive wheels to an increased value of the torque ratio applied to the auxiliary drive wheels to suppress the noise generation within the first engine operating range in the all-cylinder operating mode.

11. The four-wheel drive vehicle of claim 10, wherein when a request for shifting the operating mode of the engine to the reduced-cylinder operating mode is issued in the all-cylinder operating mode within a part of the second engine operating range on the higher engine speed side of the first engine operating range, the operating mode is shifted to the reduced-cylinder operating mode after the controller that executes the noise suppression module causes the torque ratio adjusting device to adjust the torque ratio applied to the auxiliary drive wheels to an increased value of the torque ratio applied to the auxiliary drive wheels to suppress the noise generation within the second engine operating range in the reduced-cylinder operating mode.

12. The four-wheel drive vehicle of claim 3, further comprising an all-cylinder operation damper configured to suppress the noise generation at the torque transmission assembly in the all-cylinder operating mode.

13. The four-wheel drive vehicle of claim 12, wherein the all-cylinder operation damper is a torsional damper configured to shift, to a lower engine speed side, the engine operating range where the torque transmission assembly is in the noise generating state in the all-cylinder operating mode.

14. The four-wheel drive vehicle of claim 1, wherein when the change from the first operating mode to the second operating mode, within an engine operating range where the torque ratio applied to the auxiliary drive wheels is reduced to be smaller in the second operating mode after the change than in the first operating mode before the change, the controller that executes the noise suppression module causes the torque ratio adjusting device to temporarily reduce the torque ratio applied to the auxiliary drive wheels to be smaller than the torque ratio applied in the second operating mode after the change.

15. The four-wheel drive vehicle of claim 14, wherein in the change from the all-cylinder operating mode to the reduced-cylinder operating mode, the controller that executes the noise suppression module causes the torque ratio adjusting device to temporarily change the torque ratio applied to the auxiliary drive wheels based on an operating mode changing torque map in which a relationship between an engine speed and the torque ratio applied to the auxiliary drive wheels in the change from the all-cylinder operating mode to the reduced-cylinder operating mode is preset, and in the change from the reduced-cylinder operating mode to the all-cylinder operating mode, the controller that executes the noise suppression module causes the torque ratio adjusting device to temporarily change the torque ratio applied to the auxiliary drive wheels based on the operating mode changing torque map in which a relationship between the engine speed and the torque ratio applied to the auxiliary drive wheels in the change from the reduced-cylinder operating mode to the all-cylinder operating mode is preset.

16. The four-wheel drive vehicle of claim 15,
wherein the engine is further configured with a combustion mode that is switchable between a spark-ignition mode and a compression-ignition mode, and
wherein the controller that executes the noise suppression module causes the torque ratio adjusting device to change the torque ratio applied to the auxiliary drive wheels in the spark-ignition mode and the compression-ignition mode.

17. The four-wheel drive vehicle of claim 16, wherein when a switch from the spark-ignition mode to the compression-ignition mode occurs within an engine operating range where the torque ratio applied to the auxiliary drive wheels is to be increased to be larger in the compression-ignition mode than in the spark-ignition mode, the controller that executes the noise suppression module causes the torque ratio adjusting device to temporarily increase the torque ratio applied to the auxiliary drive wheels to be larger than a torque ratio applied after the switch in the compression-ignition mode.

18. A four-wheel drive vehicle, comprising:
an engine configured with an operating mode that is switchable between an all-cylinder operating mode and a reduced-cylinder operating mode;
a torque transmission assembly configured to transmit an output torque of the engine to main drive wheels and auxiliary drive wheels;
a torque ratio adjusting device included within the torque transmission assembly, configured to adjust a ratio of the output torque that is distributed to the auxiliary drive wheels; and
a controller that executes a noise suppression module to cause the torque ratio adjusting device to increase the torque ratio applied to the auxiliary drive wheels, so as to suppress a generation of noise at the torque transmission assembly in the all-cylinder operating mode within a first engine operating range where the torque transmission assembly is in a noise generating state,
wherein in the reduced-cylinder operating mode, to suppress the noise generation, the controller that executes the noise suppression module causes the torque ratio adjusting device to increase the torque ratio applied to the auxiliary drive wheels within a second engine operating range that is on a higher engine speed side of the first engine operating range and includes an engine operating range where the torque transmission assembly is in the noise generating state in the reduced-cylinder operating mode.

* * * * *